(12) United States Patent
Nakagawa

(10) Patent No.: US 8,189,154 B2
(45) Date of Patent: May 29, 2012

(54) LIQUID CRYSTAL DISPLAY DEVICE WHEREIN EACH PIXEL HAS FIRST, SECOND, THIRD, AND, FOURTH ALIGNMENT AZIMUTHS THAT ARE DIFFERENT FROM EACH OTHER

(75) Inventor: Hidetoshi Nakagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 145 days.

(21) Appl. No.: 12/747,068

(22) PCT Filed: Dec. 5, 2008

(86) PCT No.: PCT/JP2008/003622
§ 371 (c)(1),
(2), (4) Date: Jun. 9, 2010

(87) PCT Pub. No.: WO2009/075081
PCT Pub. Date: Jun. 18, 2009

(65) Prior Publication Data
US 2010/0289975 A1 Nov. 18, 2010

(30) Foreign Application Priority Data
Dec. 13, 2007 (JP) ................................ 2007-322274

(51) Int. Cl.
*G02F 1/1337* (2006.01)
*G02F 1/1333* (2006.01)
(52) U.S. Cl. .......................................... 349/129; 349/85
(58) Field of Classification Search .................. 349/83, 349/85, 94, 128–130, 132
See application file for complete search history.

(56) References Cited

U.S. PATENT DOCUMENTS
5,859,682 A 1/1999 Kim et al.
(Continued)

FOREIGN PATENT DOCUMENTS
JP 07-199192 8/1995
(Continued)

OTHER PUBLICATIONS
International Search Report for PCT/JP2008/003622, mailed Jan. 20, 2009. English translation of the International Preliminary Report on Patentability (Chapter I), dated Aug. 19, 2010 in corresponding PCT application PCT/JP2008/003622.

*Primary Examiner* — Mark Robinson
*Assistant Examiner* — Paul Lee
(74) *Attorney, Agent, or Firm* — Nixon & Vanderhye, P.C.

(57) ABSTRACT

A liquid crystal display device according to the present invention includes a plurality of pixels, each including first and second subpixels SP-A and SP-B. The reference alignment azimuths of liquid crystal molecules in the liquid crystal layer of the first subpixel SP-A include only first and second reference alignment azimuths with no third or fourth one. The reference alignment azimuths of liquid crystal molecules in the liquid crystal layer of the second subpixel SP-B include only the third and fourth reference alignment azimuths with no first or second one. In one vertical scanning period, the absolute value of an effective voltage applied to the liquid crystal layer of the first subpixel SP-A is greater than that of an effective voltage applied to the liquid crystal layer of the second subpixel SP-B. In another vertical scanning period, the absolute value of an effective voltage applied to the liquid crystal layer of the second subpixel SP-B is greater than that of an effective voltage applied to the liquid crystal layer of the first subpixel SP-A.

18 Claims, 18 Drawing Sheets

U.S. PATENT DOCUMENTS

| | | |
|---|---|---|
| 6,437,844 B1 | 8/2002 | Hattori et al. |
| 2003/0146893 A1 | 8/2003 | Sawabe |
| 2003/0227429 A1 | 12/2003 | Shimoshikiryo |
| 2009/0195487 A1 | 8/2009 | Shimoshikiryoh et al. |
| 2009/0268110 A1 | 10/2009 | Kitayama et al. |
| 2009/0284703 A1 | 11/2009 | Shoraku et al. |

FOREIGN PATENT DOCUMENTS

| | | |
|---|---|---|
| JP | 11-352486 | 12/1999 |
| JP | 2008-145700 | 6/2008 |
| WO | 2006/121220 | 11/2006 |
| WO | WO 2006132369 A1 * | 12/2006 |

* cited by examiner

LIQUID CRYSTAL DISPLAY DEVICE WHEREIN EACH PIXEL HAS FIRST, SECOND, THIRD, AND, FOURTH ALIGNMENT AZIMUTHS THAT ARE DIFFERENT FROM EACH OTHER

This application is the U.S. national phase of International Application No. PCT/JP2008/003622, filed 5 Dec. 2008, which designated the U.S. and claims priority to Japanese Application No. 2007-322274, filed 13 Dec. 2007, the entire contents of each of which are hereby incorporated by reference.

TECHNICAL FIELD

The present invention relates to a liquid crystal display device.

BACKGROUND ART

Liquid crystal displays (LCDs) have been used in not only small display devices such as the display of a cellphone but also TV sets with a big screen. Conventional TN-mode LCDs have relatively narrow viewing angles. Recently, however, the viewing angles have been broadened in LCDs of various modes.

As one of such LCDs with a wider viewing angle than a TN-mode LCD, known is an OCB (optical compensated birefringence) mode LCD. FIG. 22 is a schematic representation illustrating an ordinary OCB mode LCD 600A. In FIG. 22, liquid crystal molecules in a liquid crystal layer 900 are in bend alignment state.

In this LCD 600A, each of two alignment films 720 and 820 that face each other with the liquid crystal layer 900 interposed between them is subjected to a rubbing treatment in direction, thereby defining the pretilt direction of liquid crystal molecules in the liquid crystal layer 900. In the liquid crystal layer 900, some liquid crystal molecules 902a, which are closer to the active-matrix substrate 700, tilt toward the +x direction to the viewer's eye, while other liquid crystal molecules 902b, which are closer to the counter substrate 800, tilt toward the −x direction to his or her eye. In this manner, those two groups of liquid crystal molecules tilt in substantially antiparallel directions as viewed in the thickness direction. As a result, a variation in refractive index, which would otherwise be caused due to varying viewing angles in the x direction, can be compensated for, thus realizing a wide viewing angle.

Meanwhile, the alignment directions of liquid crystal molecules in the liquid crystal layer 900 will change according to the magnitude of the applied voltage, thus varying the effective retardance of the liquid crystal layer and eventually changing the transmittance of the liquid crystal layer 900. The rate of this change is as fast as only several ms, and therefore, the OCB mode is known as a mode that would realize response at high speeds. An OCB-mode LCD achieves a wide viewing angle as described above. To further broaden its viewing angle, however, it has lately been proposed that an alignment division be made by performing a rubbing treatment in multiple different directions (see Patent Document No. 1, for example).

FIG. 23 is a schematic cross-sectional view illustrating a one pixel region of the LCD 600A1 disclosed in Patent Document No. 1. The LCD 600A1 has Domain A in which the alignment films 720 and 820 are subjected to a rubbing treatment in +x direction and Domain B in which the alignment films 720 and 820 are subjected to a rubbing treatment in direction. To define multiple regions with mutually different alignment directions in a single unit region in this manner is called "alignment division". By providing these two types of domains with mutually different rubbing directions for the LCD 600A1, the variation in refractive index can be compensated for in the x and y directions and the viewing angle can be further broadened as a result.

On the other hand, the viewing angle has also been broadened in LCDs operating in non-OCB modes. For example, some VA (vertical alignment) mode LCD that would achieve a high contrast ratio is known to get such alignment division done by providing ribs and/or slits for two electrodes that face each other with a liquid crystal layer interposed between them (see Patent Document No. 2, for example). Such a mode is sometimes called an MVA (multi-domain vertical alignment) mode.

An LCD 600B as disclosed in Patent Document No. 2 will be described with reference to FIGS. 24(a) and 24(b), which are respectively a schematic plan view and a schematic cross-sectional view of the LCD 600B.

In the LCD 600B, each pixel is split into two subpixels SP-A and SP-B, which are defined by subpixel electrodes 710a and 710b. By producing mutually different potentials at those subpixel electrodes 710a and 710b when a grayscale tone is displayed, the viewing angle dependence of the γ characteristic can be reduced. To split a single pixel into two or more subpixels in this manner is sometimes called a "pixel division". Furthermore, in this LCD 600B, the polarities of the voltages applied to the subpixel electrodes 710a and 710b are inverted every vertical scanning period, for example, thereby reducing the image persistence phenomenon.

Also, in this LCD 600B, a slit (an opening) 712a, 712b is provided in the subpixel electrodes 710a and 710b of the active-matrix substrate 700, while the counter electrode 810 of the counter substrate 800 has ribs (projections) 812a, 812b. These slits 712a and 712b and ribs 812a and 812b run in two intersecting directions D1 and D2. When a voltage is applied to the liquid crystal layer, the liquid crystal molecules will align themselves from the ribs 812a and 812b toward the slits 712a and 712b, thereby forming multiple liquid crystal domains A, B, C and D with mutually different alignment directions in each of the subpixels SP-A and SP-B. Consequently, this LCD 600B realizes a symmetric viewing angle characteristic.

Unlike a TN- or OCB-mode LCD in which the pretilt direction of liquid crystal molecules is defined by alignment films, those linear slits and/or ribs apply alignment regulating force to the liquid crystal molecules of an MVA-mode LCD. That is why the alignment regulating force applied to the liquid crystal molecules within a pixel region varies according to the distance from a slit or a rib, thus making the response speeds of those liquid crystal molecules different within the single pixel region. On top of that, in the MVA-mode LCD, a region with a slit or a rib has a decreased transmittance, and will cause a lower display luminance. To overcome these problems, it has been proposed that a mode that forms an alignment division structure using alignment films that define pretilt directions be applied to even such a VA-mode LCD. Such a mode is called a VATN (vertical alignment twisted nematic) mode. In a VATN-mode LCD, for each of two alignment films that face each other with a liquid crystal layer interposed between them, provided are two sets of alignment regions that define two different pretilt directions for the liquid crystal molecules (see Patent Document No. 3, for example).

Hereinafter, the LCD 600C disclosed in Patent Document No. 3 will be described with reference to FIGS. 25 and 26.

Specifically, FIG. 25(a) is a schematic representation illustrating the alignment treatment direction of the alignment film 720 of the LCD 600C, while FIG. 25(b) is a schematic representation illustrating the alignment treatment direction of the alignment film 820. As shown in FIG. 25, the circular cylindrical liquid crystal molecules are tilted so that their (substantially circular) end faces the viewer. In the liquid crystal layer of this LCD 600C, four groups of liquid crystal domains A, B, C and D are produced by combining the two alignment regions of the alignment film 720 with those of the alignment film 820. FIG. 25(c) illustrates the alignment directions of liquid crystal molecules around the center of the liquid crystal domains A through D. Supposing the alignment directions of the liquid crystal molecules around the center of the liquid crystal domains A through D will be referred to herein as "reference alignment directions" and the azimuthal components of the reference alignment directions will be referred to herein as "reference alignment azimuths", the liquid crystal domains A through D have mutually different reference alignment azimuths, thus realizing a symmetric viewing angle characteristic.

FIG. 26 is a schematic plan view of the LCD 600C, in which a pixel division structure is formed in the same way as in the LCD 6008 and four liquid crystal domains A through D are defined in each subpixel SP-A. With such a pixel division structure, the LCD 600C has a reduced degree of viewing angle dependence of the γ characteristic.

The VATN-mode LCD 600C will sometimes produce peculiar misalignment. As a result, there is a region, of which the luminance is lower than the one associated with a grayscale tone to be displayed when the screen is viewed straight, thus producing dark lines. Those dark lines will be produced not only at the center of the subpixel electrode 710a where the liquid crystal domains are adjacent to each other but also along at least some of the edges of the subpixel electrode 710a as well. If in any of the edge portions of the subpixel electrode 710a associated with the liquid crystal domains, the azimuthal direction that intersects with that edge portion at right angles and that points toward the inside of the subpixel electrode 710a forms an angle of greater than degrees with respect to any of the reference alignment directions of the liquid crystal domains, then a dark line will be produced inside of, and substantially parallel to, that edge portion of the subpixel electrode 710a. Such a dark line will be referred to herein as a "domain line". FIG. 25(c) illustrates four domain lines DL1 through DL4. They say that those domain lines are produced because the reference alignment directions of the liquid crystal domains A through D and the directions of the alignment regulating forces produced by an oblique electric field generated at the edges of the subpixel electrode 710a have mutually opposing components, thus disturbing the alignment of the liquid crystal molecules there. Those domain lines are produced at various locations according to the alignment treatment directions of the alignment films 720 and 820. On the other hand, dark lines are also produced around the center of the subpixel electrode 710a because the liquid crystal molecules have mutually different alignment directions and do not transmit light at the boundaries between the liquid crystal domains A through D. Such dark lines CL around the center of the subpixel electrode 710a are sometimes called "disclination lines".

The dark lines including domain lines and disclination lines, will look moving according to the viewing angle. And unless those dark lines are shielded from incoming light, the grayscale will be inverted. For that reason, in the LCD 600C, the dark lines are shielded from incoming light, thereby minimizing the decline in viewing angle characteristic. Specifically, the domain lines DL1 and DL3 are shielded with source bus lines S and the domain lines DL2 and DL4 are shielded with gate bus lines G and CS bus lines CS. The disclination lines CL are shielded with storage capacitor lines CS1 and drain lines 717.

Patent Document No. 1: Japanese Patent Application Laid-Open Publication No. 10-293308

Patent Document No. 2: Japanese Patent Application Laid-Open Publication No. 2004-62146

Patent Document No. 3: Pamphlet of PCT International Application Publication No. 2006/132369

DISCLOSURE OF INVENTION

Problems to be Solved by the Invention

As shown in FIG. 24(a), in the LCD 600B, four liquid crystal domains A, B, C and D are defined in each of the subpixels SP-A and SP-B, and therefore, the slits 712a, 712b and the ribs 812a, 812b run in the directions D1 and D2. However, if the slits 712a, 712b and the ribs 812a, 812b are bent in this manner, the alignment of the liquid crystal molecules is easily disturbed at the bending point and the transmittance will eventually drop.

On the other hand, FIG. 27 schematically illustrates two subpixels that form one pixel in the LCD 600C. In the LCD 600C, each of the subpixels SP-A and SP-B has liquid crystal domains A through D. However, since the boundaries between the liquid crystal domains A through D produce dark lines that do not transmit light due to the misalignment of the liquid crystal molecules as described above, the transmittance will always decrease, no matter whether the dark lines are shielded or not.

As described above, if the pixel division and alignment division structures are combined with each other, then the boundaries between the liquid crystal domains will account for an increased percentage of the overall display area, thus causing a decrease in transmittance and contrast ratio. Patent Document No. 1 does not mention the pixel division structure. However, if the LCD 600A1 disclosed in Patent Document No. 1 is subjected to the pixel division in the same way as in the LCDs 600B and 600C, the transmittance and the contrast ratio will also decrease.

It is therefore an object of the present invention to provide a liquid crystal display device that minimizes the decrease in transmittance with a good viewing angle characteristic.

Means for Solving the Problems

A liquid crystal display device according to the present invention includes a plurality of pixels, each of which includes first and second subpixels. Each of the first and second subpixels includes a counter electrode, a subpixel electrode, and a liquid crystal layer that is arranged between the counter electrode and the subpixel electrode. The liquid crystal layer of each pixel has liquid crystal molecules that are induced to align in a number of reference alignment directions, including first, second, third and fourth reference alignment directions, at least at a particular grayscale. If the azimuthal components that define those reference alignment directions are called reference alignment azimuths, first, second, third and fourth reference alignment azimuths, defining the first, second, third and fourth reference alignment directions, respectively, are different from each other. The reference alignment azimuths of the liquid crystal molecules in the liquid crystal layer of the first subpixel include only the first and second reference alignment azimuths and include neither the third nor fourth reference alignment azimuth. The reference alignment azimuths of the liquid crystal molecules in the liquid crystal layer of the second subpixel include only the third and fourth reference alignment azimuths and include neither the first nor second reference alignment azimuth. In one vertical scanning period, the absolute value of an effective voltage applied to the liquid crystal layer of the first subpixel is greater than that of an effective voltage applied to the liquid crystal layer of the second subpixel. In another vertical scanning period that is posterior to the one vertical scanning period, the absolute value of an effective voltage applied to the liquid crystal layer of the second subpixel is greater than that of an effective voltage applied to the liquid crystal layer of the first subpixel.

In one embodiment, the angle formed between any two of the first, second, third and fourth reference alignment azimuths is substantially an integral multiple of 90 degrees.

In one embodiment, the counter electrode of each of the first sub-pixel and the second sub-pixel is a single common electrode.

In one embodiment, the liquid crystal layer of the first subpixel includes: a first liquid crystal domain in which liquid crystal molecules are induced to align in the first reference alignment direction in response to an applied voltage; and a second liquid crystal domain in which liquid crystal molecules are induced to align in the second reference alignment direction in response to the applied voltage. The liquid crystal layer of the second subpixel includes: a third liquid crystal domain in which liquid crystal molecules are induced to align in the third reference alignment direction in response to an applied voltage; and a fourth liquid crystal domain in which liquid crystal molecules are induced to align in the fourth reference alignment direction in response to the applied voltage.

In one embodiment, the liquid crystal layer includes a vertical alignment liquid crystal layer.

In one embodiment, liquid crystal molecules around the center of the first, second, third and fourth liquid crystal domains are induced to align in the first, second, third and fourth reference alignment azimuths, respectively, in response to the applied voltage.

In one embodiment, the angle formed between the first and second reference alignment azimuths is approximately 90 degrees and the angle formed between the third and fourth reference alignment azimuths is also approximately 90 degrees.

In one embodiment, each of the first and second subpixels further includes at least one alignment film that defines the pretilt direction of the liquid crystal molecules of the liquid crystal layer.

In one embodiment, the at least one alignment film includes a first alignment film and a second alignment film that faces the first alignment film across the liquid crystal layer. The first alignment film has a first alignment region that induces alignment of the liquid crystal molecules of the first and second liquid crystal domains in a first pretilt direction and a second alignment region that induces alignment of the liquid crystal molecules of the third and fourth liquid crystal domains in a second pretilt direction. The second alignment film has a third alignment region that induces alignment of the liquid crystal molecules of the first and fourth liquid crystal domains in a third pretilt direction and a fourth alignment region that induces alignment of the liquid crystal molecules of the second and third liquid crystal domains in a fourth pretilt direction.

In one embodiment, the first, second, third and fourth alignment regions have been subjected to alignment treatment in first, second, third and fourth alignment treatment directions, respectively. The first alignment treatment direction of the first alignment region is substantially antiparallel to the second alignment treatment direction of the second alignment region. And the third alignment treatment direction of the third alignment region is substantially antiparallel to the fourth alignment treatment direction of the fourth alignment region.

In one embodiment, the first, second, third and fourth alignment regions are defined by optical alignment treatment.

In one embodiment, a slit or a rib is provided in at least one of the counter electrode and the subpixel electrode of each of the first and second subpixels.

In one embodiment, the angle formed between the first and second reference alignment azimuths is approximately 180 degrees, and the angle formed between the third and fourth reference alignment azimuths is also approximately 180 degrees.

In one embodiment, the liquid crystal layer of the first subpixel has a first liquid crystal domain, the liquid crystal layer of the second subpixel has a second liquid crystal domain, and the liquid crystal layer includes an OCB-mode liquid crystal layer. In the liquid crystal layer of the first subpixel, liquid crystal molecules closer to the counter electrode are induced to align in the first reference alignment direction and liquid crystal molecules closer to the subpixel electrode are induced to align in the second reference alignment direction. And in the liquid crystal layer of the second subpixel, liquid crystal molecules closer to the counter electrode are induced to align in the third reference alignment direction and liquid crystal molecules closer to the subpixel electrode are induced to align in the fourth reference alignment direction.

In one embodiment, each of the first and second subpixels further includes at least one alignment film that defines the pretilt direction of the liquid crystal molecules of the liquid crystal layer.

In one embodiment, the at least one alignment film includes a first alignment film and a second alignment film that faces the first alignment film across the liquid crystal layer. The first alignment film has a first alignment region that induces alignment of the liquid crystal molecules of the first liquid crystal domain in a first pretilt direction and a second alignment region that induces alignment of the liquid crystal molecules of the second liquid crystal domain in a second pretilt direction. The second alignment film has a third alignment region that induces alignment of the liquid crystal molecules of the first liquid crystal domain in a third pretilt direction and a fourth alignment region that induces alignment of the liquid crystal molecules of the second liquid crystal domain in a fourth pretilt direction.

In one embodiment, the first, second, third and fourth alignment regions have been subjected to alignment treatment in first, second, third and fourth alignment treatment directions, respectively, so as to define the first, second, third and fourth pretilt directions. The angle formed between the first and second alignment treatment directions of the first and second alignment regions is approximately 90 degrees. And the angle formed between the third and fourth alignment treatment directions of the third and fourth alignment regions is also approximately 90 degrees.

In one embodiment, if a predetermined grayscale tone is displayed continuously over an even number of, and at least two, vertical scanning periods, the first and second subpixels have mutually different luminances in at least two of the even number of vertical scanning periods. In each of the first and second subpixels, a first polarity period, which is included in the even number of vertical scanning periods and which has a first polarity, is as long as a second polarity period, which is also included in the even number of vertical scanning periods and which has a second polarity. In each of the first and second polarity periods, the difference between the average of effective voltages applied to the liquid crystal layer of the first subpixel and that of effective voltages applied to the liquid crystal layer of the second subpixel is substantially equal to zero.

Effects of the Invention

The present invention provides a liquid crystal display device that minimizes the decrease in transmittance with a good viewing angle characteristic.

Figure 1:
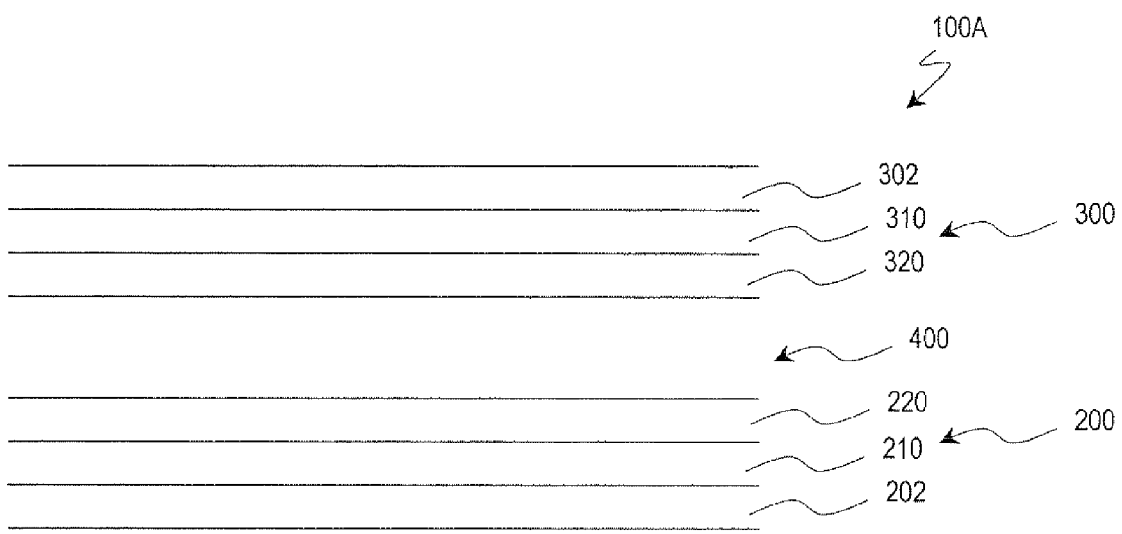
FIG. 1 is a schematic representation illustrating a first embodiment of a liquid crystal display device according to the present invention.

DESCRIPTION OF REFERENCE NUMERALS 100 liquid crystal display device
200 active-matrix substrate
210 pixel electrode
220 alignment film
300 counter substrate
310 counter electrode
320 alignment film

BEST MODE FOR CARRYING OUT THE INVENTION

Embodiment 1

Hereinafter, a First Embodiment of a Liquid Crystal display device according to the present invention will be described with reference to the accompanying drawings.

FIG. 1 shows a schematic representation illustrating the liquid crystal display device 100A in the present embodiment. The liquid crystal display device 100A includes an active-matrix substrate 200, a counter substrate 300 and a liquid crystal layer 400, which is interposed between the active-matrix substrate 200 and the counter substrate 300. The active-matrix substrate 200 includes a pixel electrode 210 that is supported on an insulating substrate 202 and an alignment film 220, which covers the pixel electrode 210 (and which will be referred to herein as a "first alignment film"). On the other hand, the counter substrate 300 includes a counter electrode 310 supported on a transparent insulating substrate 302 and an alignment film 320, which is arranged on the counter electrode 310 (and which will be referred to herein as a "second alignment film"). The liquid crystal layer 400 is arranged between the respective alignment films 220 and 320 of the active-matrix substrate 200 and the counter substrate 300. Even though only main members of the active-matrix substrate 200 and counter substrate 300 are shown in FIG. 1, it will be easily understandable to those skilled in the art that the active-matrix substrate 200 and the counter substrate 300 actually have other members.

Although not shown in FIG. 1, a number of pixels are arranged in columns and rows on the active-matrix substrate 200 to form a matrix pattern there, and each of those pixels has at least one switching element, which may be a thin-film transistor (TFT), for example. As used herein, the "pixel" refers to a minimum unit of display that represents a particular grayscale. When a color display operation is performed, each pixel is a unit that represents the grayscale of R, G or B and is also called a "dot". And a combination of R, G and B pixels forms a single color display pixel.

The liquid crystal layer 400 is a vertical alignment type and has liquid crystal molecules with negative dielectric anisotropy. Also, although not shown in FIG. 1, a polarizer is provided for each of the active-matrix substrate 200 and the counter substrate 300. Therefore, the two polarizers are arranged so as to face each other with the liquid crystal layer 400 interposed between themselves. Also, the two polarizers are arranged so that their transmission axes (or polarization axes) cross each other at right angles (i.e., so that one of the two axes is parallel to the horizontal direction (i.e., row direction) and the other is parallel to the vertical direction (i.e., column direction)). By combining such a pair of polarizers that are arranged as crossed Nicols with the liquid crystal layer 400 in this manner, the liquid crystal display device 100A conducts a display operation in normally black mode. Furthermore, although not shown in FIG. 1, the liquid crystal display device 100A may have a backlight, if necessary.

Figure 2:
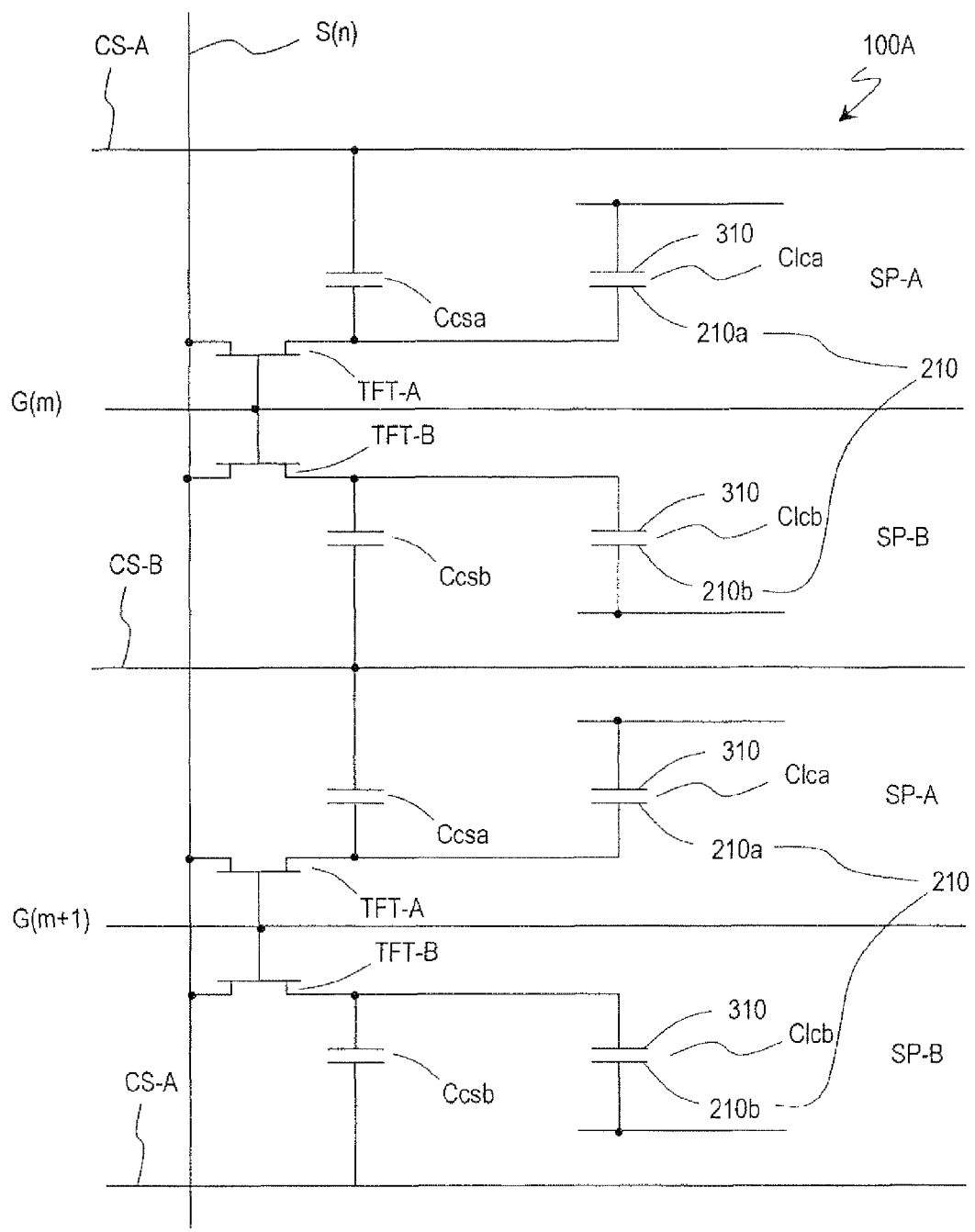
FIG. 2 is an equivalent circuit diagram representing two pixels of the liquid crystal display device of the first embodiment.

FIG. 2 is an equivalent circuit diagram representing two pixels of the liquid crystal display device 100A. Specifically, one pixel located at the intersection between the $m^{th}$ row and the $n^{th}$ column and another pixel located at the intersection between the $(m+1)^{th}$ row and the $n^{th}$ column are shown in FIG. 2. Each pixel electrode 210 includes two subpixel electrodes 210a and 210b that are electrically isolated from each other, and each pixel is split into two subpixels SP-A and SP-B that are defined by the subpixel electrodes 210a and 210b, respectively. The subpixels SP-A and SP-B have TFT-A and TFT-B, respectively. In FIG. 2, gate bus lines associated with the $m^{th}$ row and the $(m+1)^{th}$ row are identified by G(m) and G(m+1), respectively, and a source bus line associated with the $n^{th}$ column is identified by S(n). The respective gate electrodes of TFT-A and TFT-B of the subpixels SP-A and SP-B belonging to the same pixel are connected to the same gate bus line G(m) or G(m+1). Also, the respective source electrodes of TFT-As and TFT-Bs of the pixels on the same column are connected in common to the same source bus line S(n). In FIG. 2, the counter electrode 310 is illustrated separately for the respective subpixels SP-A and SP-B. In general, however, the counter electrode 310 is a single electrode to be shared in common by every pixel.

The subpixel SP-A (first subpixel) includes a liquid crystal capacitor Clca and a storage capacitor Ccsa. One electrode of the liquid crystal capacitor Clca and one electrode of the storage capacitor Ccsa of the subpixel SP-A are connected to the drain electrode of TFT-A, the other electrode of the liquid crystal capacitor Clca is connected to the counter electrode 310, and the other electrode of the storage capacitor Ccsa is connected to a storage capacitor line CS-A. Likewise, the subpixel SP-B (second subpixel) also includes a liquid crystal capacitor Clcb and a storage capacitor Ccsb. One electrode of the liquid crystal capacitor Clcb and one electrode of the storage capacitor Ccsb of the subpixel SP-B are connected to the drain electrode of TFT-B, the other electrode of the liquid crystal capacitor Clcb is connected to the counter electrode 310, and the other electrode of the storage capacitor Ccsb is connected to a storage capacitor line CS-B.

Each liquid crystal capacitor Clca, Clcb is formed by a portion of the liquid crystal layer 400 shown in FIG. 1 that is associated with the subpixels SP-A and SP-B, the counter electrode 310 and the subpixel electrodes 210a and 210b. Look at the pixel at the intersection between the $m^{th}$ row and the $n^{th}$ column, for example, and it can be seen that each storage capacitor Ccsa, Ccsb is formed by a storage capacitor electrode that is electrically connected to the subpixel electrode 210a, 210b, a storage capacitor counter electrode that is electrically connected to a storage capacitor line (CS bus line) CS-A, CS-B and an insulating layer (not shown) arranged between the electrode and the line. The storage capacitor counter electrodes of the storage capacitors Ccsa and Ccsb are independent of each other and can be supplied with mutually different storage capacitor counter voltages through the CS bus lines CS-A and CS-B, respectively.

Hereinafter, the pretilt directions of liquid crystal molecules as defined by the alignment films 220 and 320 and the alignment directions of the liquid crystal molecules at the respective centers of the liquid crystal domains will be described with reference to FIG. 3.

Figure 3:
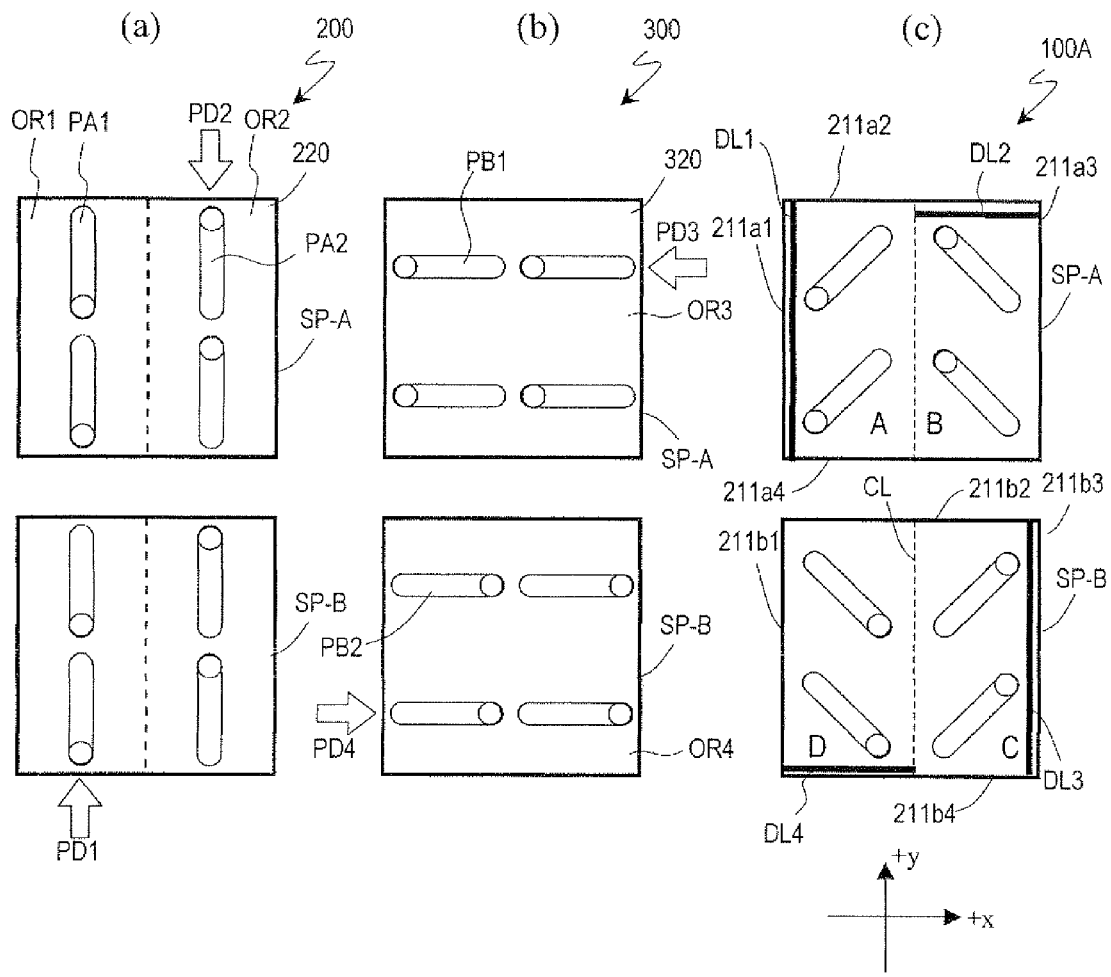
FIGS. 3(a) and 3(b) are schematic representations illustrating the two alignment films of the liquid crystal display device of the first embodiment and FIG. 3(c) is a schematic representation illustrating the alignment directions of liquid crystal molecules around the respective centers of liquid crystal domains.

FIG. 3(*a*) indicates the pretilt directions PA1 and PA2 of liquid crystal molecules as defined by the alignment film 220 of the active-matrix substrate 200. FIG. 3(*b*) indicates the pretilt directions PB1 and PB2 of liquid crystal molecules as defined by the alignment film 320 of the counter substrate 300. And FIG. 3(*c*) shows the alignment directions of liquid crystal molecules at the respective centers of the liquid crystal domains A through D when a voltage is applied thereto and also shows domain lines DL1 through DL4, which look dark due to their disturbed alignment. It should be noted that the domain lines DL1 through DL4 are not so-called "disclination lines".

FIGS. 3(*a*) to 3(*c*) schematically show the alignment directions of the liquid crystal molecules as viewed by the viewer. Also, in FIGS. 3(*a*) to 3(*c*), the circular cylindrical liquid crystal molecules tilt so that its (substantially circular) end points at the viewer. Also, in FIGS. 3(*a*) to 3(*c*), the liquid crystal molecules tilt just slightly with respect to a normal to the principal surface of the alignment films 220 and 320 (i.e., have relatively large tilt angles). In FIGS. 3(*a*) and 3(*b*), the pretilt angle may be greater than or equal to 85 degrees and less than 90 degrees, for example. Furthermore, the upper one of the two rectangles shown in each of FIGS. 3(*a*) to 3(*c*) indicates the subpixel SP-A, while the lower rectangles indicates the subpixel SP-B.

As shown in FIG. 3(*a*), the alignment film 220 has first and second alignment regions OR1 and OR2. The liquid crystal molecules in the first alignment region OR1 tilt in the −y direction with respect to a normal to the principal surface of the alignment film 220. Meanwhile, the liquid crystal molecules in the second alignment region OR2 tilt in the direction with respect to a normal to the principal surface of the alignment film 220. The boundary between the first and second alignment regions OR1 and OR2 runs in the column direction (i.e., y direction) and passes approximately the center of the subpixel SP-A, SP-B in the row direction.

On the other hand, the alignment film 320 has third and fourth alignment regions OR3 and OR4 as shown in FIG. 3(*b*). The liquid crystal molecules in the third alignment region OR3 tilt in the +x direction with respect to a normal to the principal surface of the alignment film 320 and their end in the −x direction faces forward. Meanwhile, the liquid crystal molecules in the fourth alignment region OR4 tilt in the −x direction with respect to a normal to the principal surface of the alignment film 320 and their end in the +x direction faces forward. The boundary between the third and fourth alignment regions OR3 and OR4 runs in the row direction (i.e., x direction) and is located between the subpixels SP-A and SP-B.

In the following description, the direction in which an alignment film is subjected to an alignment treatment will be referred to herein as an "alignment treatment direction". The alignment treatment direction corresponds to an azimuthal component defined by projecting a line that runs toward an alignment region along the long axis of liquid crystal molecules onto that alignment region. The alignment treatment directions of the first, second, third and fourth alignment regions will be referred to herein as "first, second, third and fourth alignment treatment directions", respectively.

In the alignment film 220, the first alignment region OR1 has been subjected to an alignment treatment in a first alignment treatment direction PD1, while the second alignment region OR2 has been subjected to an alignment treatment in a second alignment treatment direction PD2, which is different from the first alignment treatment direction PD1. In this case, the first alignment treatment direction PD1 is substantially antiparallel to the second alignment treatment direction PD2. On the other hand, in the alignment film 320, the third alignment region OR3 has been subjected to an alignment treatment in a third alignment treatment direction PD3, while the fourth alignment region OR4 has been subjected to an alignment treatment in a fourth alignment treatment direction PD4, which is different from the third alignment treatment direction PD3. In this case, the third alignment treatment direction PD3 is substantially antiparallel to the fourth alignment treatment direction PD4. Also, the angle formed between the first and second alignment treatment directions PD1, PD2 and the third and fourth alignment treatment directions PD3, PD4 is approximately 90 degrees.

As shown in FIG. 3(*c*), four liquid crystal domains A, B, C and D are formed in the liquid crystal layer. In this liquid crystal display device 100A, the liquid crystal domains A and B are formed in the subpixel SP-A and the liquid crystal domains C and D are formed in the subpixel SP-B. Specifically, a portion of the liquid crystal layer 400 that is sandwiched between the first alignment region OR1 of the alignment film 220 and the third alignment region OR3 of the alignment film 320 becomes the liquid crystal domain A. Another portion of the liquid crystal layer 400 that is sandwiched between the second alignment region OR2 of the alignment film 220 and the third alignment region OR3 of the alignment film 320 becomes the liquid crystal domain B. Still another portion of the liquid crystal layer 400 that is sandwiched between the second alignment region OR2 of the alignment film 220 and the fourth alignment region OR4 of the alignment film 320 becomes the liquid crystal domain C. And yet another portion of the liquid crystal layer 400 that is sandwiched between the first alignment region OR1 of the alignment film 220 and the fourth alignment region OR4 of the alignment film 320 becomes the liquid crystal domain D.

The alignment direction of liquid crystal molecules at the center of the liquid crystal domain A through D becomes an intermediate direction between the two pretilt directions of liquid crystal molecules defined by the alignment films 220 and 320. In the following description, the alignment direction of liquid crystal molecules at the center of a liquid crystal domain will be referred to herein as a "reference alignment direction" and the azimuthal component of the reference alignment direction that points forward (i.e. from the rear side toward the front side) along the long axis of liquid crystal molecules (i.e., the azimuthal component defined by projecting the reference alignment direction onto the principal surface of the alignment film 220 or 320) will be referred to herein as a "reference alignment azimuth". The reference alignment azimuth is characteristic of its associated liquid crystal domain and has dominant influence on the viewing angle characteristic of that liquid crystal domain. Supposing the counterclockwise direction with respect to the horizontal direction (the left-to-right direction) of the display screen (or the paper of the drawings) is positive (e.g., supposing the three o'clock direction defines an azimuthal angle of 0 degrees and the counterclockwise direction is positive if the display screen is compared to the face of a clock), the reference alignment directions of the four liquid crystal domains A through D are defined so that the difference between any two of those four directions becomes substantially an integral multiple of 90 degrees. Specifically, the reference alignment azimuths of the liquid crystal domains A, B, C and D may be 225, 135, 45 and 315 degrees, respectively.

As shown in FIG. 3(c), domain lines DL1 to DL4 are produced in the liquid crystal domains A, B, C and D, respectively. Specifically, the domain line DL1 is produced parallel to an edge portion 211a1 of the subpixel electrode 210a. The domain line DL2 is produced parallel to a part of an edge portion 211a2 of the subpixel electrode 210a. The domain line DL3 is produced parallel to an edge portion 211b3 of the subpixel electrode 210b. And the domain line DL4 is produced parallel to a part of an edge portion 211b4 of the subpixel electrode 210b. Also, as indicated by the dotted line, a disclination line CL is observed along the boundary between each pair of the liquid crystal domains A to D. The disclination line CL is a dark line of the center portion described above. In this case, the disclination lines CL and the domain lines DL1 to DL4 are continuous with each other, thus producing dark lines in an inverted swastika shape.

It should be noted that the pretilt directions of the liquid crystal molecules defined by the alignment films 220 and 320 as shown in FIGS. 3(a) and 3(b) do not change substantially responsive to an applied voltage, except some minor variations with time. On the other hand, if a voltage applied to display a certain grayscale is greater than a predetermined value, the liquid crystal molecules at the center of each liquid crystal domain will tilt with respect to a normal to the principal surface of the alignment films 220 and 320 as shown in FIG. 3(c). However, if a low voltage is applied to display black, for example, then the liquid crystal molecules at the center of each liquid crystal domain will be substantially parallel to a normal to the principal surface of the alignment films 220 and 320.

The liquid crystal domains A and B are produced in the subpixel SP-A, while the liquid crystal domains C and D are produced in the subpixel SP-B. That is why two of the four reference alignment azimuths are assigned to the subpixel SP-A and the other two reference alignment azimuths are assigned to the subpixel SP-B.

Figure 27:
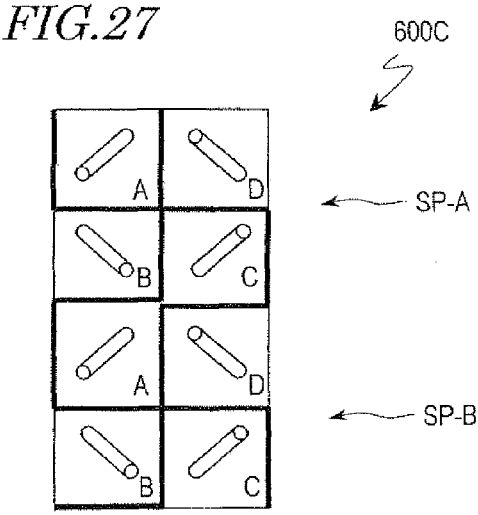
FIG. 27 is a schematic representation showing the reference alignment directions of liquid crystal molecules in the LCD shown in FIG. 25.

Comparing FIG. 3(c) to FIG. 27, it can be seen that the number of liquid crystal domains of each subpixel SP-A, SP-B is smaller in the liquid crystal display device 100A than in the LCD 600C, so is the number of boundaries between adjacent liquid crystal domains. That is why even if the boundary between the liquid crystal domains needs to be shielded, the decrease in transmittance can be less significant in the liquid crystal display device 100A than in the LCD 600C. That is to say, in the LCD 600C shown in FIG. 27, disclination lines are formed in a cross shape in each of the subpixels SP-A and SP-B. In the liquid crystal display device 100A, on the other hand, a disclination line is produced in each of the subpixels SP-A and SP-B in the column direction (i.e., y direction) but no disclination lines are produced in the row direction (i.e., x direction). Consequently, compared to the LCD 600C having the same configuration as this liquid crystal display device 100A except the number of liquid crystal domains produced in each subpixel, this liquid crystal display device 100A can increase the transmittance by about 5 to 10%. Also, in the LCD 600C, the smaller the size of a pixel, the more serious the influence of the disclination lines and the more significantly the transmittance will drop. In this liquid crystal display device 100A, however, the decrease in transmittance can be minimum even if the pixel size decreases.

In the liquid crystal display device 100A, if the effective voltage applied to the liquid crystal layer of the subpixel SP-A is equal to the one applied to the liquid crystal layer of the subpixel SP-B, a symmetric viewing angle is realized as in the LCD 600C that has already been described with reference to FIG. 25(c). However, if mutually different effective voltages are applied to the liquid crystal layer of the subpixels SP-A and SP-B to display a grayscale tone, for example, a bright subpixel, of which the effective voltage has the greater absolute value, and a dark subpixel, of which the effective voltage has the smaller absolute value, will be produced. In that case, the reference alignment azimuths of the bright and dark subpixels will not be symmetric to each other. Consequently, the symmetric viewing angle cannot be realized unless something is done about it. For that reason, the liquid crystal display device 100A of this embodiment inverts the brightness levels of the subpixels.

Figure 4:
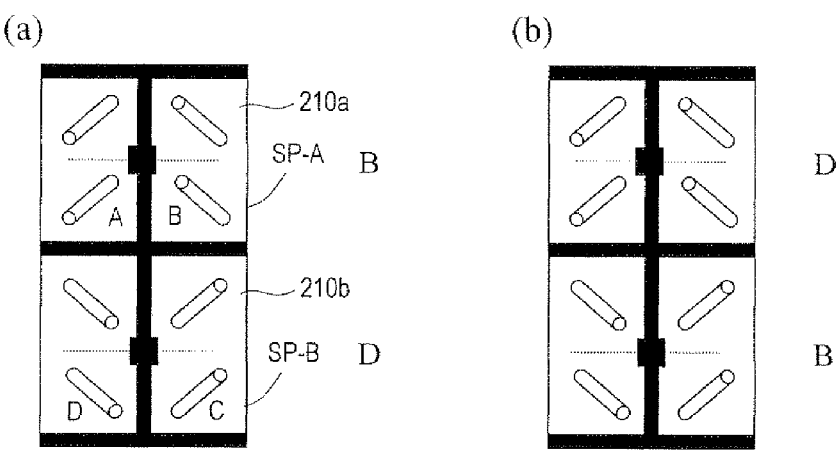
FIGS. 4(a) and 4(b) are schematic representations showing the reference alignment directions of liquid crystal molecules in the liquid crystal display device of the first embodiment in one vertical scanning period and the next vertical scanning period, respectively.

Hereinafter, it will be described with reference to FIG. 4 how to invert the brightness levels of the subpixels SP-A and SP-B. FIGS. 4(a) and 4(b) are schematic representations illustrating the bright and dark states of the subpixels SP-A and SP-B of the liquid crystal display device 100A in one vertical scanning period and in the next vertical scanning period, respectively. It should be noted that the liquid crystal molecules illustrated in FIG. 4 are supposed to align in the reference alignment directions in the respective liquid crystal domains A to D.

In one vertical scanning period (which is supposed to be an $n^{th}$ vertical scanning period, where n is a natural number), the absolute value of an effective voltage applied to the liquid crystal layer of the subpixel SP-A is greater than that of an effective voltage applied to the liquid crystal layer of the subpixel. SP-B. For example, as shown in FIG. 2, after a positive write voltage has been applied through the same source bus line S(n) to the subpixel electrodes 210a and 210b that define the subpixels SP-A and SP-B, the subpixel electrode 210a has its voltage raised by the CS bus line CS-A, while the subpixel electrode 210b that defines the subpixel SP-B has its voltage lowered by the CS bus line CS-A. As a result, the absolute value of the effective voltage applied to the liquid crystal layer of the subpixel SP-A becomes greater than that of the effective voltage applied to the liquid crystal layer of the subpixel SP-B. In that case, the subpixel SP-A becomes a bright subpixel and the subpixel SP-B becomes a dark subpixel. Also, in this vertical scanning period, the bright (B)/dark (D) states and the reference alignment azimuths of the four liquid crystal domains A to D of a single pixel are (B, 225°), (B, 135°), (D, 45°) and (D, 315°), respectively.

Thereafter, in the next vertical scanning period (which is supposed to be an $(n+1)^{th}$ vertical scanning period), the absolute value of an effective voltage applied to the liquid crystal layer of the subpixel SP-B is greater than that of an effective voltage applied to the liquid crystal layer of the subpixel SP-A. For example, as shown in FIG. 2, after a negative write voltage has been applied through the same source bus line S(n) to the subpixel electrodes 210a and 210b that define the subpixels SP-A and SP-B, the subpixel electrode 210a has its voltage raised by the CS bus line CS-A, while the subpixel electrode 210b that defines the subpixel SP-B has its voltage lowered by the CS bus line CS-A. As a result, the absolute value of the effective voltage applied to the liquid crystal layer of the subpixel SP-B becomes greater than that of the effective voltage applied to the liquid crystal layer of the subpixel SP-A. In that case, the subpixel SP-A becomes a dark subpixel and the subpixel SP-B becomes a bright subpixel. Also, in this vertical scanning period, the B/D states and the reference alignment azimuths of the four liquid crystal domains A to D of a single pixel are (D, 225°), (D, 135°), (B, 45°) and (B, 315°), respectively.

Over these two vertical scanning periods, each bright subpixel has symmetric reference alignment azimuths, so does each dark subpixel. In this manner, each of the liquid crystal domains A through D in which liquid crystal molecules have mutually different reference alignment azimuths belongs to both of the bright and dark subpixels. Unlike the LCD 600C disclosed in Patent Document No. 3, this liquid crystal display device 100A does not realize symmetric reference alignment directions in the bright and dark subpixels every vertical scanning period, but does realize the symmetric reference alignment directions every other vertical scanning period.

Generally speaking, one vertical scanning period is very short. For example, the vertical scanning frequency is usually 60 Hz. In that case, one vertical scanning period is 16.67 ms. On the other hand, if a so-called 2× drive, in which two vertical scanning periods of a liquid crystal panel are allocated to one vertical scanning period of an input video signal (i.e., if the vertical scanning frequency is 120 Hz), is performed, for example, one vertical scanning period of the liquid crystal panel is 8.33 ms. As used herein, one "vertical scanning period" is defined to be an interval between a point in time when one scan line is selected to write a display signal voltage and a point in time when that scan line is selected to write the next display signal voltage. Also, each of one frame period of a non-interlaced drive input video signal and one field period of an interlaced drive input video signal will be referred to herein as "one vertical scanning period of the input video signal". Normally, one vertical scanning period of a liquid crystal display device corresponds to one vertical scanning period of the input video signal. In the example to be described below, one vertical scanning period of the liquid crystal panel is supposed to correspond to that of the input video signal for the sake of simplicity. However, the present invention is not limited to it. The present invention is also applicable to a so-called "2× drive" with a vertical scanning frequency of 120 Hz in which two vertical scanning periods of the liquid crystal panel (that lasts 2×1/120 sec, for example) are allocated to one vertical scanning period of the input video signal that lasts 1/60 sec, for example). Also, in this example, the lengths of the respective vertical scanning periods are supposed to be equal to each other. Furthermore, in each vertical scanning period, the interval between a point in time when one scan line is selected and a point in time when the next scan line is selected will be referred to herein as one horizontal scanning period (1 H).

The two subpixels SP-A and SP-B of the same pixel are arranged in the column direction (i.e., y direction). In a 52-inch full-spec high-definition TV monitor, each subpixel has as small a size as 0.2 mm×0.3 mm (i.e., has a pixel size of 0.2 mm×0.6 mm).

One vertical scanning period is so short and the subpixels SP-A and SP-B have so small a pitch that virtually no problem should arise even if the reference alignment azimuths are made symmetric by using two different subpixels over two vertical scanning periods. As a result, the liquid crystal display device 100A can reduce the viewing angle dependence of the γ characteristic and can achieve a symmetric viewing angle and a good viewing angle characteristic. On top of that, the liquid crystal display device 100A inverts the brightness levels of the subpixels SP-A and SP-B, thereby reducing the uneven distribution of the DC level and minimizing the occurrence of image persistence and other reliability issues.

Figure 5:
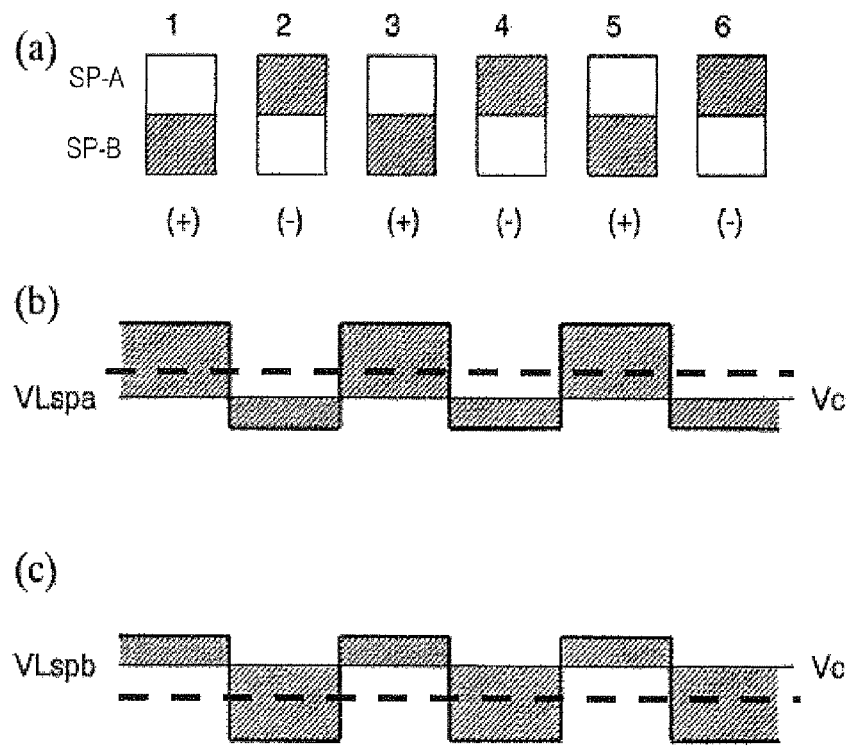
FIG. 5(a) is a schematic representation showing how subpixels SP-A and SP-B change their brightness levels and polarities in the liquid crystal display device of the first embodiment and FIGS. 5(b) and 5(c) are schematic representations showing variations in the effective voltages applied to the liquid crystal layer of its subpixels SP-A and SP-B.

In the embodiment described above, the brightness levels are supposed to be inverted between the bright and dark levels every vertical scanning period. However, the present invention is not limited to it. As shown in FIG. 5(*a*), not only the brightness levels but also the polarity thereof may be inverted every vertical scanning period. In FIG. 5(*a*), "+" and "−" represent the polarities of the display signal voltages when the associated scan line is selected with respect to the common voltage applied to the counter electrode. Herein, "+" indicates that the potential at the first and second subpixel electrodes is higher than the one at the counter electrode and that the electric field is directed from the subpixel electrodes toward the counter electrode. On the other hand, "−" indicates that the potential at the first and second subpixel electrodes is lower than the one at the counter electrode and that the electric field is directed from the counter electrode toward the subpixel electrodes. In the following description, "+" and "−" will be referred to herein as a "first polarity" and a "second polarity", respectively, and will also be collectively referred to herein as "polarities". Also, a period with the "+" polarity and a period with the "−" polarity will be referred to herein as a "first polarity period" and a "second polarity period", respectively. Such a combination of brightness level inversion and polarity inversion is disclosed in Japanese Patent Application Laid-Open Publication No. 2003-295160, for example, the disclosure of which is hereby incorporated by reference.

However, if the brightness levels and polarities are inverted a number of times over several frames as shown in FIG. 5(*a*), then the average of the effective voltages VLspa applied to the liquid crystal layer of the subpixel SP-A will go positive as shown in FIG. 5(*b*) and that of the effective voltages VLspb applied to the liquid crystal layer of the subpixel SP-B will go negative as shown in FIG. 5(*c*). As a result, an uneven distribution of DC levels will remain among the subpixels, thus possibly causing image persistence and other reliability issues.

Figure 6:
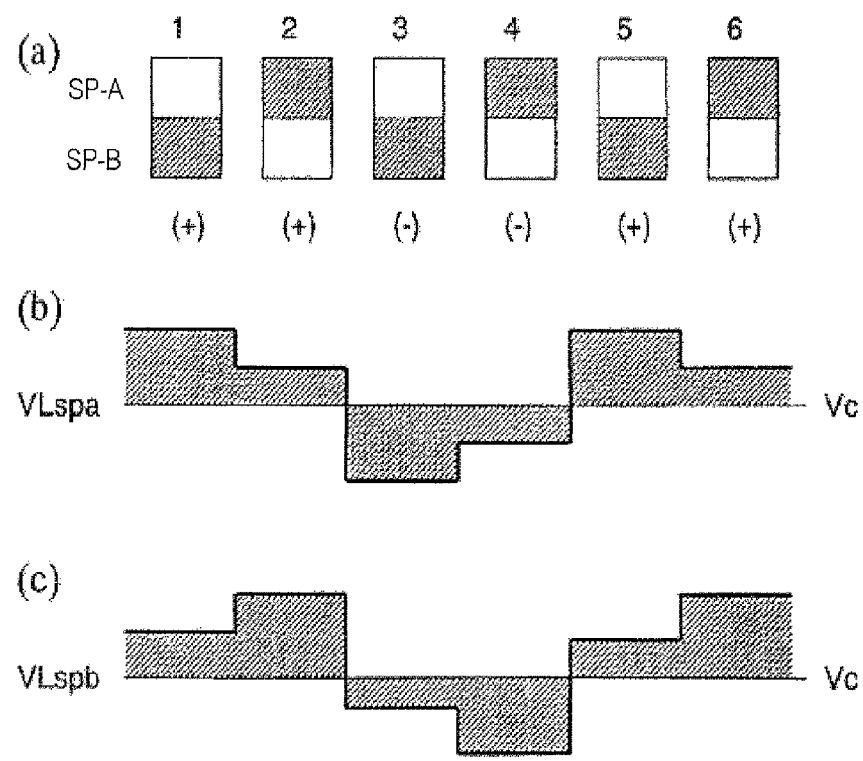
FIG. 6(a) is a schematic representation showing how subpixels SP-A and SP-B change their brightness levels and polarities in a liquid crystal display device as a modified example of the first embodiment and FIGS. 6(b) and 6(c) are schematic representations showing variations in the effective voltages applied to the liquid crystal layer of its subpixels SP-A and SP-B.

To overcome such a problem, the brightness levels and polarities of the subpixel SP-A may be changed in the order of (B, +), (D, +), (B, −) and (D, −) and those of the subpixel SP-B may be changed in the order of (D, +), (B, +), (D, −) and (B, −) as shown in FIG. 6(*a*). In that case, the brightness levels of the subpixels SP-A and SP-B will be inverted every other vertical scanning period, and therefore, the non-smoothness of the image on the screen can be reduced. Also, since the brightness levels of the subpixels SP-A and SP-B are inverted in both of the first and second polarity periods, the average of the effective voltages VLspa applied over multiple vertical scanning periods becomes substantially equal to that of the effective voltages VLspb over the same periods as shown in FIGS. 6(*b*) and 6(*c*). Therefore, the averages of the effective voltages VLspa and VLspb can be both reduced to zero by regulating the counter voltage. As a result, the occurrence of image persistence and other reliability issues can be minimized.

In FIGS. 5(*b*) and (*c*) and FIGS. 6(*b*) and (*c*), the effective voltages VLspa and VLspb applied to the liquid crystal layer (or liquid crystal capacitors) of the subpixels SP-A and SP-B in each vertical scanning period are indicated by the bold lines. The effective voltages VLspa and VLspb applied to the liquid crystal layer of the first and second subpixels SP-A and SP-B are effective values, each representing the difference between the voltage applied to the first or second subpixel electrode and the voltage Vc applied to the counter electrode. And the voltage Vc applied to the counter electrode is illustrated as being constant in this example. Also, to avoid complicating the description overly, a predetermined grayscale tone is supposed to be displayed over several frames.

Look at FIG. 3 again. The alignment films 220 and 320 may be formed by either rubbing treatment or optical alignment treatment. In the latter case, the alignment film 220 is irradiated obliquely with an ultraviolet ray. Even though their angles are not exactly the same, the liquid crystal molecules will tilt in almost the same direction as the direction in which the ultraviolet ray is coming. By irradiating obliquely the alignment film 220 with an ultraviolet ray in the directions indicated by the arrows in FIGS. 3(a) and (b), the liquid crystal molecules in the first alignment region OR1 will tilt in the −y direction with respect to a normal to the principal surface of the alignment film 220 and the liquid crystal molecules in the second alignment region OR2 will tilt in the +y direction with respect to a normal to the principal surface of the alignment film 220. Likewise, when the optical alignment treatment is performed, the alignment film 320 is also irradiated obliquely with an ultraviolet ray. Even though their angles are not exactly the same, the liquid crystal molecules will tilt in almost the same direction as the direction in which the ultraviolet ray is coming. By irradiating obliquely the alignment film 320 with an ultraviolet ray in the directions indicated by those arrows, the liquid crystal molecules in the third alignment region OR3 will tilt in the +x direction with respect to a normal to the principal surface of the alignment film 320 and their end in the −x direction faces forward, and the liquid crystal molecules in the fourth alignment region OR4 will tilt in the −x direction with respect to a normal to the principal surface of the alignment film 320 and their end in the +x direction faces forward. An alignment film that has been subjected to such an optical alignment treatment is sometimes called an "optical alignment film".

Also, in this case, the boundary between the first and second alignment regions OR1 and OR2 of the alignment film 220 is substantially parallel to the alignment treatment direction of the first and second alignment regions OR1 and OR2. And the boundary between the third and fourth alignment regions OR3 and OR4 of the alignment film 320 is substantially parallel to the alignment treatment direction of the third and fourth alignment regions OR3 and OR4. By carrying out the alignment treatment in this manner, the width of a region with a non-controllable pretilt direction, which would be produced in the vicinity of the boundary, can be reduced significantly compared to a situation where the alignment treatment is performed perpendicularly to the boundary.

As disclosed in pamphlet of PCT International Application Publication No 2006/121220, the respective pretilt angles defined by the alignment films 220 and 320 are preferably approximately equal to each other because the display luminance characteristic can be improved in that case. Particularly, if the difference between the pretilt angles defined by the alignment films 220 and 320 is less than or equal to one degree, the alignment directions of liquid crystal molecules around the middle of the liquid crystal layer 400 (i.e., the reference alignment directions) can be controlled with good stability and the display luminance characteristic can be improved significantly. Conversely, if the difference between the pretilt angles increased, then the reference alignment directions would vary significantly from one position in the liquid crystal layer to another and there would be regions with lower transmittances than the intended one. That is to say, the transmittance would be non-uniform. Also, to achieve a good degree of symmetry in viewing angle, the respective areas of the four liquid crystal domains of a single pixel region are preferably equal to each other. Specifically, the difference in area between the biggest and smallest ones of the four liquid crystal domains preferably accounts for less than or equal to 25% of the area of the biggest one.

In the embodiment described above, the alignment treatment directions PD1 to PD4 of the first, second, third and fourth alignment regions OR1 to OR4 of the alignment films 220 and 320 are supposed to be +y, −y, −x and +x directions, respectively, as shown in FIG. 3 and inverted swastika dark lines are produced as a result. The present invention is not limited to it.

Figure 7:
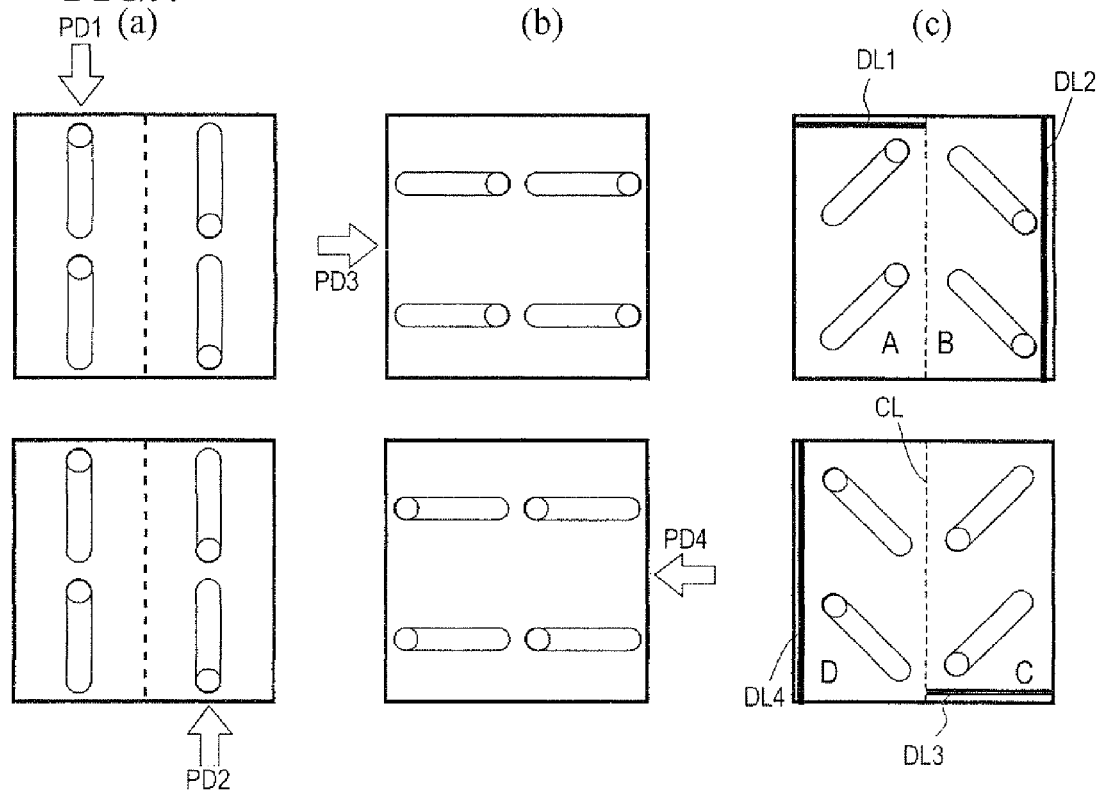
FIGS. 7(a) and 7(b) are schematic representations illustrating the two alignment films of a liquid crystal display device as a modified example of the first embodiment and FIG. 7(c) is a schematic representation illustrating the alignment directions of liquid crystal molecules around the respective centers of liquid crystal domains.

As shown in FIG. 7, the alignment treatment directions PD1 to PD4 of the first, second, third and fourth alignment regions OR1 to OR4 of the alignment films 220 and 320 may also be −y, +y, +x and −x directions, respectively. In that case, swastika dark lines are produced.

Figure 8:
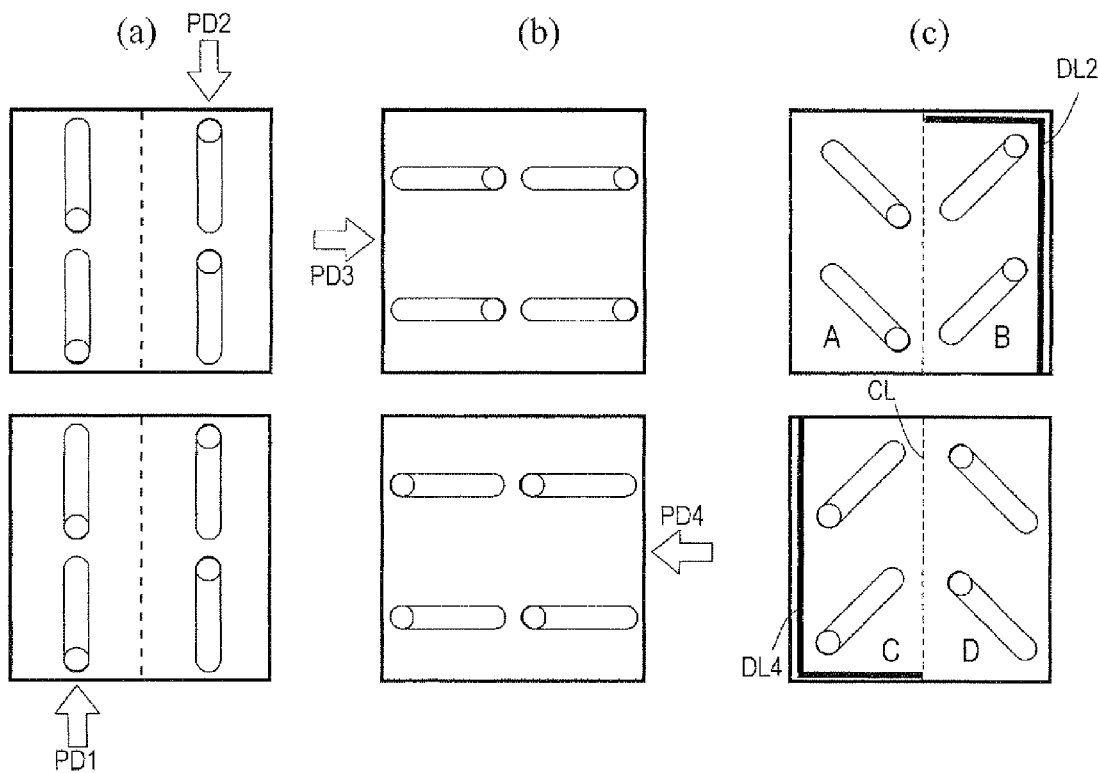
FIGS. 8(a) and 8(b) are schematic representations illustrating the two alignment films of a liquid crystal display device as another modified example of the first embodiment and FIG. 8(c) is a schematic representation illustrating the alignment directions of liquid crystal molecules around the respective centers of liquid crystal domains.

Alternatively, as shown in FIG. 8, the alignment treatment directions PD1 to PD4 of the first, second, third and fourth alignment regions OR1 to OR4 of the alignment films 220 and 320 may also be +y, −y, +x and −x directions, respectively. In that case, 8-shape dark lines are produced.

Figure 9:
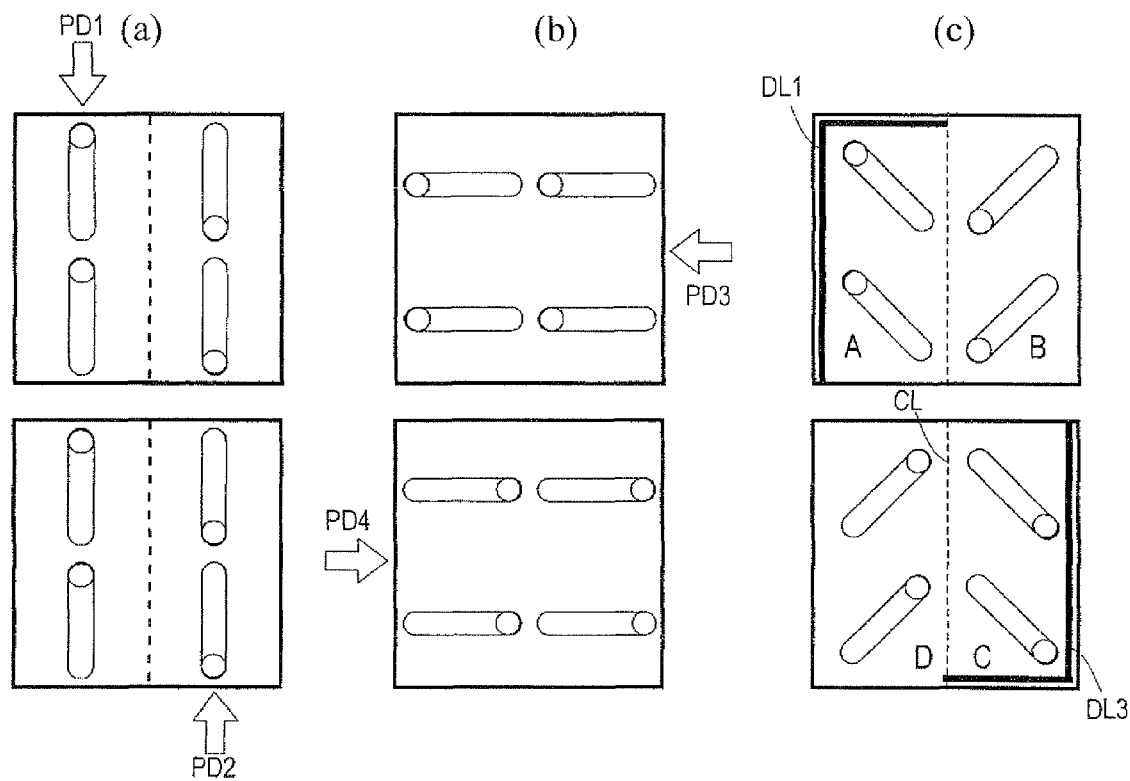
FIGS. 9(a) and 9(b) are schematic representations illustrating the two alignment films of a liquid crystal display device as another modified example of the first embodiment and FIG. 9(c) is a schematic representation illustrating the alignment directions of liquid crystal molecules around the respective centers of liquid crystal domains.

Still alternatively, as shown in FIG. 9, the alignment treatment directions PD1 to PD4 of the first, second, third and fourth alignment regions OR1 to OR4 of the alignment films 220 and 320 may also be −y, +y, −x and +x directions, respectively. In that case, 8-shape dark lines are produced, too.

In the embodiment described above, the respective gate electrodes of TFT-A and TFT-B of the subpixels SP-A and SP-B of each pixel are connected to the same gate bus line. However, the present invention is not limited to it. Substantially twice as many gate bus lines as the rows of pixels may be provided so that the respective gate electrodes of TFT-A and TFT-B of the subpixels SP-A and SP-B are connected to two different gate bus lines.

Also, in the embodiment described above, two CS bus lines are provided to supply mutually different CS signals to the subpixels SP-A and SP-B of the same pixel. However, the present invention is not limited to it. Two source bus lines may be provided for each column of pixels so that mutually different signal voltages can be supplied to the subpixel electrodes 210a and 210b associated with the subpixels SP-A and SP-B.

Furthermore, in the embodiment described above, a single CS bus line is provided for two subpixels of two pixels that are adjacent to each other in the column direction and supposed to raise or lower the voltage applied to the liquid crystal capacitors of the subpixels of those two adjacent pixels. But this arrangement may be modified according to the present invention. A single CS bus line may be provided for each subpixel.

Embodiment 2

Hereinafter, a second embodiment of a liquid crystal display device according to the present invention will be described.

Figure 10:
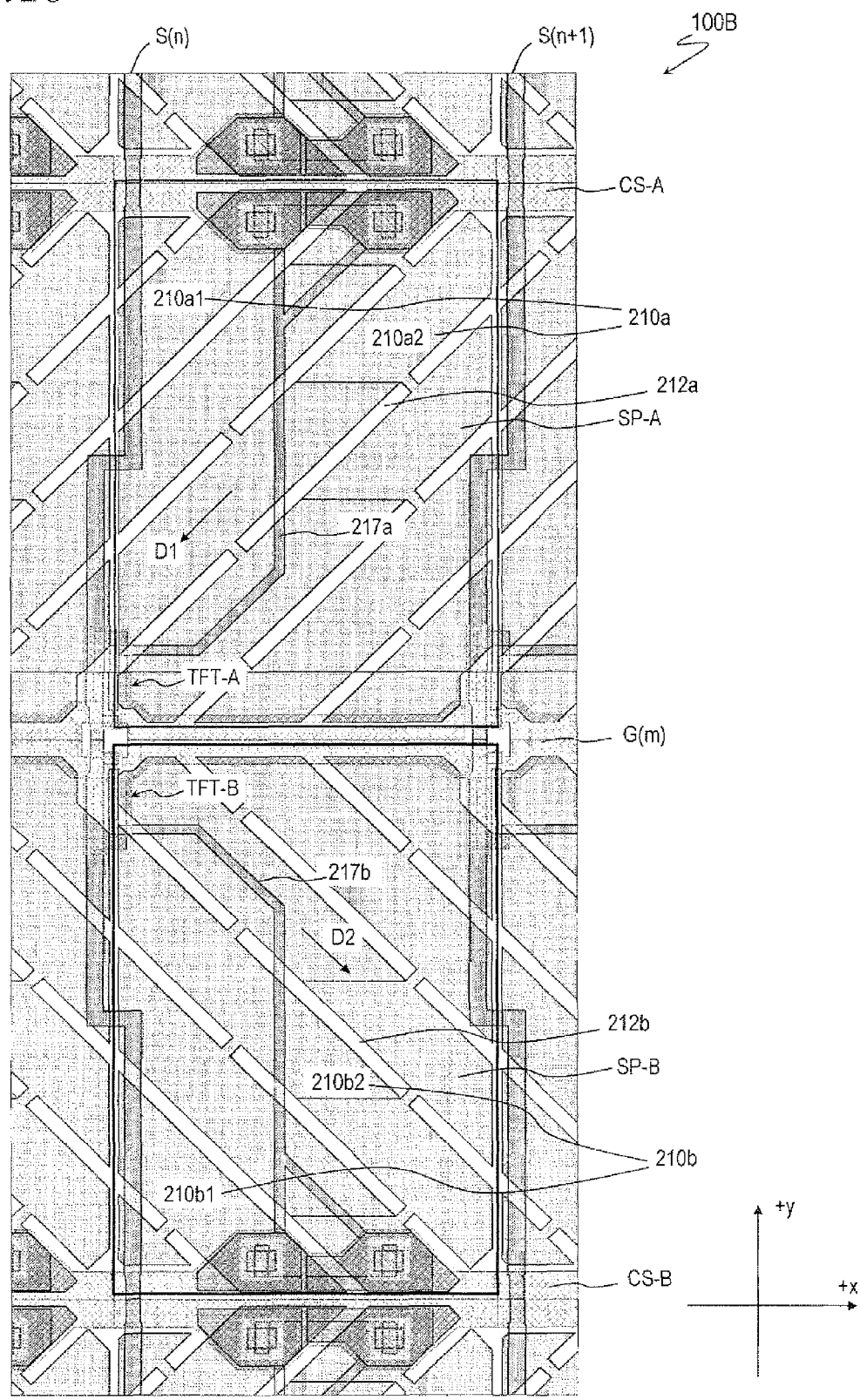
FIG. 10 is a schematic representation illustrating a second embodiment of a liquid crystal display device according to the present invention.

FIG. 10 is a schematic representation illustrating the liquid crystal display device 100B in the present embodiment. Unlike the liquid crystal display device 100A, this liquid crystal display device 100B is an MVA-mode LCD that uses ribs and/or slits, which are provided for subpixel electrodes and/or counter electrode, as alignment regulating means. It should be noted that this liquid crystal display device 100B is also represented by the same schematic cross-sectional view and the same equivalent circuit diagram as those of the liquid crystal display device 100A shown in FIGS. 1 and 2, and the overlapping description thereof will be omitted herein to avoid redundancies. In this liquid crystal display device 100B, the alignment films 220 and 320 shown in FIG. 1 are vertical alignment films.

Specifically, FIG. 10 is a schematic plan view illustrating the active-matrix substrate 200 of the liquid crystal display device 100B. In the liquid crystal display device 100B, each pixel is split into two subpixels SP-A and SP-B, which have a substantially rectangular shape and are defined by subpixel electrodes 210a and 210b, respectively.

The subpixel electrode 210a includes an electrode portion 210a1 and another electrode portion 210a2, which is isolated from the former electrode portion 210a1. Slits 212a, which run from a 45 degree direction toward a 225 degree direction (i.e., in the direction D1), are cut through the electrode portions 210a1 and 210a2. Each of these electrode portions 210a1 and 210a2 includes a number of stripes that are arranged parallel to each other. And two stripes that are adjacent to each other in the electrode portions 210a1 and 210a2 are connected together. On the whole, the subpixel electrode 210a has a roughly rectangular shape, through which a number of slits 212a running in the direction D1 have been cut.

In the same way, the subpixel electrode 210b includes an electrode portion 210b1 and another electrode portion 210b2, which is electrically isolated from the former electrode portion 210b1. Slits 212b, which run from a 135 degree direction toward a 315 degree direction (i.e., in the direction D2), are cut through the electrode portions 210b1 and 210b2. Each of these electrode portions 210b1 and 210b2 includes a number of stripes that are arranged parallel to each other. And two stripes that are adjacent to each other in the electrode portions 210b1 and 210b2 are connected together. On the whole, the subpixel electrode 210b has a roughly rectangular shape, through which a number of slits 212b running in the direction D2 have been cut.

The subpixel SP-A includes TFT-A, of which the gate, source and drain electrodes are respectively connected to a gate bus line G(m), a source bus line S(n), and a storage capacitor electrode opposed to a CS bus line CS-A by way of a drain extension line 217a. Through a contact hole that has been cut through a storage capacitor electrode, the drain extension line 217a is connected to the subpixel electrode 210a. In this example, the drain extension line 217a is split into two branches that are connected to not only two electrically isolated storage capacitor electrodes but also the electrode portions 210a1 and 210a2 that form the subpixel electrode 210a via contact holes that have been cut through the storage capacitor electrodes. The potential at one electrode portion 210a1 is equal to the one at the other electrode portion 210a2.

Likewise, the subpixel SP-B includes TFT-B, of which the gate, source and drain electrodes are respectively connected to the gate bus line G(m), the source bus line S(n), and a storage capacitor electrode opposed to a CS bus line CS-B by way of a drain extension line 217b. Through a contact hole that has been cut through a storage capacitor electrode, the drain extension line 217b is connected to the subpixel electrode 210b.

Although not shown in FIG. 10, alignment regulating structures are also arranged on the counter electrode 310 of the counter substrate 300 of the liquid crystal display device 100B so as to run substantially parallel to the slits 212a and 212b of the subpixel electrodes 210a and 210b. The alignment regulating structures may be ribs, for example, which do not usually transmit light.

Also, in general, the source bus lines S(n), S(n+1) and drain extension lines 217a, 217b are formed by performing a single processing step using the same metallic material. In that case, none of the source bus lines S(n), S(n+1) and drain extension lines 217a, 217b transmit light. To minimize a decrease in aperture ratio, the source bus lines S(n), S(n+1) and drain extension lines 217a, 217b are arranged so as to overlap with the ribs as much as possible. Furthermore, the source bus lines S(n), S(n+1) run in a bending pattern.

In this liquid crystal display device 100B, the liquid crystal layer is a vertical alignment type and has liquid crystal molecules with negative dielectric anisotropy. If the effective voltage applied to the liquid crystal layer of the subpixels SP-A and SP-B is substantially zero, the liquid crystal molecules in the liquid crystal layer will align perpendicularly to the principal surface of the alignment films 220 and 320. As a result, a low luminance (black) is displayed. Meanwhile, as the absolute value of the effective voltage applied to the liquid crystal layer of the subpixels SP-A and SP-B increases, the liquid crystal molecules gradually get tilted under the alignment regulating force produced by the alignment regulating means (e.g., the ribs and the slits) with respect to a normal to the principal surface of the alignment films 220 and 320. Consequently, a medium luminance (grayscale tone) is displayed.

Figure 11:
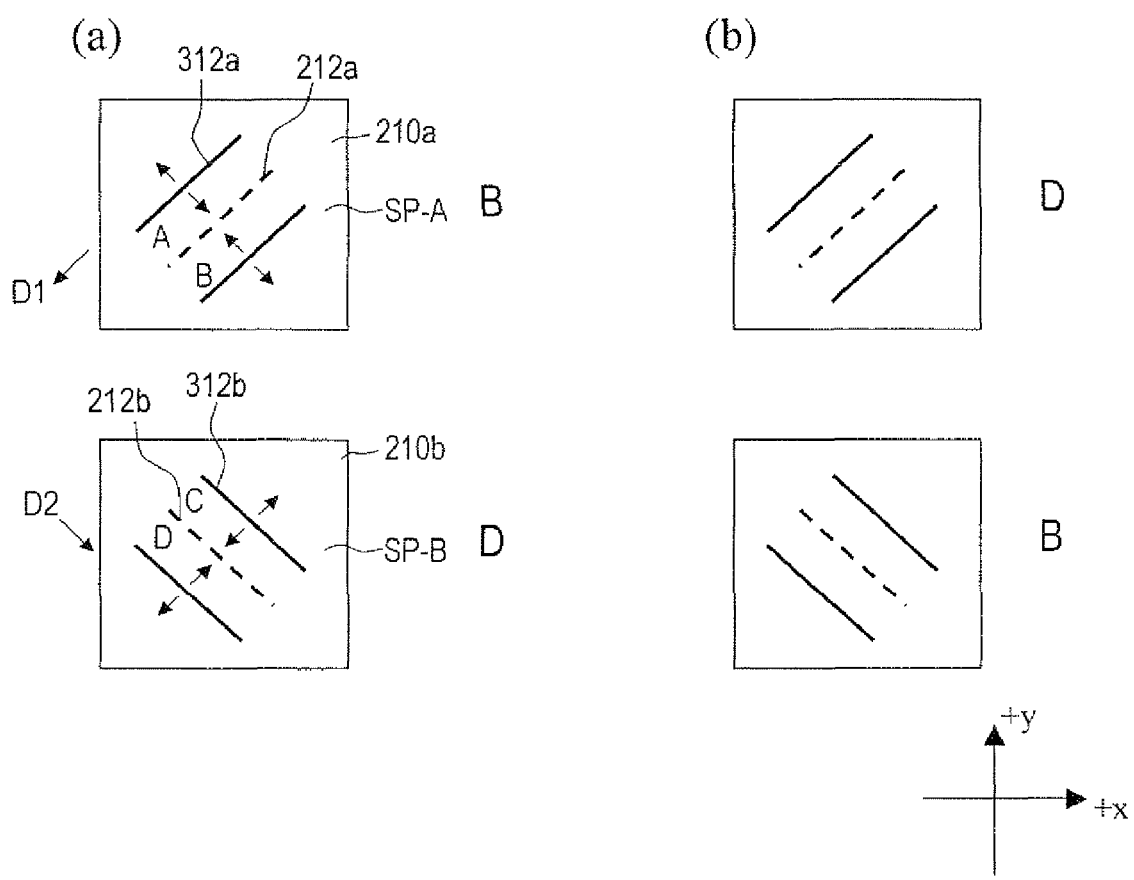
FIGS. 11(a) and 11(b) are schematic representations showing the reference alignment directions of liquid crystal molecules in the liquid crystal display device of the second embodiment in one vertical scanning period and the next vertical scanning period, respectively.

FIG. 11 schematically illustrates two subpixels with alignment regulating structures in the liquid crystal display device 100B. Specifically, FIG. 11(a) is a schematic representation indicating the reference alignment directions of liquid crystal molecules in the liquid crystal display device 100E during one vertical scanning period (which may be an $n^{th}$ vertical scanning period). On the other hand, FIG. 11(b) is a schematic representation indicating the reference alignment directions of the liquid crystal molecules in the next vertical scanning period (which may be $(n+1)^{th}$ vertical scanning period). It should be noted that only one slit 212a and two ribs 312a for the subpixel SP-A and only one slit 212b and two ribs 312b for the subpixel SP-B are illustrated in FIG. 11 to avoid getting the drawings overly complicated.

In this liquid crystal display device 100B, the slit 212a and ribs 312a running in the direction D1 are provided for the subpixel SP-A and two liquid crystal domains A and B are formed in the subpixel SP-A. The liquid crystal molecules in those liquid crystal domains A and B align so as to cross the slits 212a and ribs 312a at right angles. Specifically, the liquid crystal domain A has a reference alignment azimuth of 315 degrees, while the liquid crystal domain B has a reference alignment azimuth of 135 degrees.

On the other hand, the slit 212b and ribs 312b running in the direction D2 are provided for the subpixel SP-B. The direction D2 intersects with the direction D1 and may intersect with the direction D1 at right angles, for example. Two liquid crystal domains C and D are formed in the subpixel SP-B. The liquid crystal molecules in those liquid crystal domains C and D align so as to cross the slits 212b and ribs 312b at right angles. Specifically, the liquid crystal domain C has a reference alignment azimuth of 225 degrees, while the liquid crystal domain D has a reference alignment azimuth of 45 degrees. In this manner, four liquid crystal domains A to D with mutually different reference alignment azimuths are produced in a single pixel.

In the LCD 600B that has already been described with reference to FIG. 24(a), four liquid crystal domains A, B, C and D are formed in each of the subpixels SP-A and SP-B. In this liquid crystal display device 100B, on the other hand, two liquid crystal domains A and B are formed in the subpixel SP-A and two liquid crystal domains C and D are formed in the subpixel SP-B. That is why if the effective voltage applied to the liquid crystal layer of the subpixel SP-A is equal to the one applied to the liquid crystal layer of the subpixel SP-B, a symmetric viewing angle is realized. However, if mutually different effective voltages are applied to the liquid crystal layer of the subpixels SP-A and SP-B to display a grayscale tone, for example, the reference alignment azimuths of bright and dark subpixels will not be symmetric to each other. Consequently, the symmetric viewing angle cannot be realized unless something is done about it. For that reason, the liquid crystal display device 100B of this embodiment also inverts the brightness levels of the subpixels.

As shown in FIG. 11(a), the absolute value of an effective voltage applied to the liquid crystal layer of the subpixel SP-A is greater than that of an effective voltage applied to the liquid crystal layer of the subpixel SP-B. For example, as shown in FIG. 10, after a positive write voltage has been applied through the same source bus line S(n) to the subpixel electrodes 210a and 210b that define the subpixels SP-A and SP-B, the subpixel electrode 210a has its voltage raised by the CS bus line CS-A, while the subpixel electrode 210b that defines the subpixel SP-B has its voltage lowered by the CS bus line CS-A. As a result, the absolute value of the effective voltage applied to the liquid crystal layer of the subpixel SP-A becomes greater than that of the effective voltage applied to the liquid crystal layer of the subpixel SP-B. In that case, the subpixel SP-A becomes a bright subpixel and the subpixel SP-B becomes a dark subpixel. Also, in this vertical scanning period, the bright (B)/dark (D) states and the reference alignment azimuths of the four liquid crystal domains A to D of a single pixel are (B, 315°), (B, 135°), (D, 225°) and (D, 45°), respectively.

Thereafter, in the next vertical scanning period, the absolute value of an effective voltage applied to the liquid crystal layer of the subpixel SP-B is greater than that of an effective voltage applied to the liquid crystal layer of the subpixel SP-A. For example, as shown in FIG. 10, after a negative write voltage has been applied through the same source bus line S(n) to the subpixel electrodes 210a and 210b that define the subpixels SP-A and SP-B, the subpixel electrode 210a has its voltage raised by the CS bus line CS-A, while the subpixel electrode 210b that defines the subpixel SP-B has its voltage lowered by the CS bus line CS-A. As a result, the absolute value of the effective voltage applied to the liquid crystal layer of the subpixel SP-B becomes greater than that of the effective voltage applied to the liquid crystal layer of the subpixel SP-A. In that case, the subpixel SP-A becomes a dark subpixel and the subpixel SP-B becomes a bright subpixel. Also, in this vertical scanning period, the B/D states and the reference alignment azimuths of the four liquid crystal domains A to D of a single pixel are (D, 315°), (D, 135°), (B, 225°) and (B, 45°), respectively.

Over these two vertical scanning periods, each bright subpixel has symmetric reference alignment azimuths, so does each dark subpixel. In this manner, each of the liquid crystal domains A through D in which liquid crystal molecules have mutually different reference alignment azimuths belongs to both of the bright and dark subpixels. Unlike the LCD 600B disclosed in Patent Document No. 2, this liquid crystal display device 100B does not realize symmetric reference alignment directions in the bright and dark subpixels every vertical scanning period, but does realize the symmetric reference alignment directions every other vertical scanning period. On top of that, the slits 212a, 212b and ribs 312a, 312b of the subpixels SP-A and SP-B may just run in one direction. That is to say, the alignment regulating structures do not have to be bent, and therefore, the decrease in transmittance can be minimized.

Optionally, in this liquid crystal display device 100B, the polarity, as well as the brightness level, may also be inverted every vertical scanning period just as already described with reference to FIG. 5. Or as already described with reference to FIG. 6, the averages of the effective voltages applied to liquid crystal layer of the subpixels SP-A and SP-B over four consecutive vertical scanning periods may be substantially equal to each other.

In the liquid crystal display device 100B shown in FIG. 10, its subpixels SP-A and SP-B are roughly rectangular, and therefore, a pixel as a whole is also almost rectangular. However, the present invention is not limited to it. Each pixel may also have a bent shape as a whole.

Figure 12:
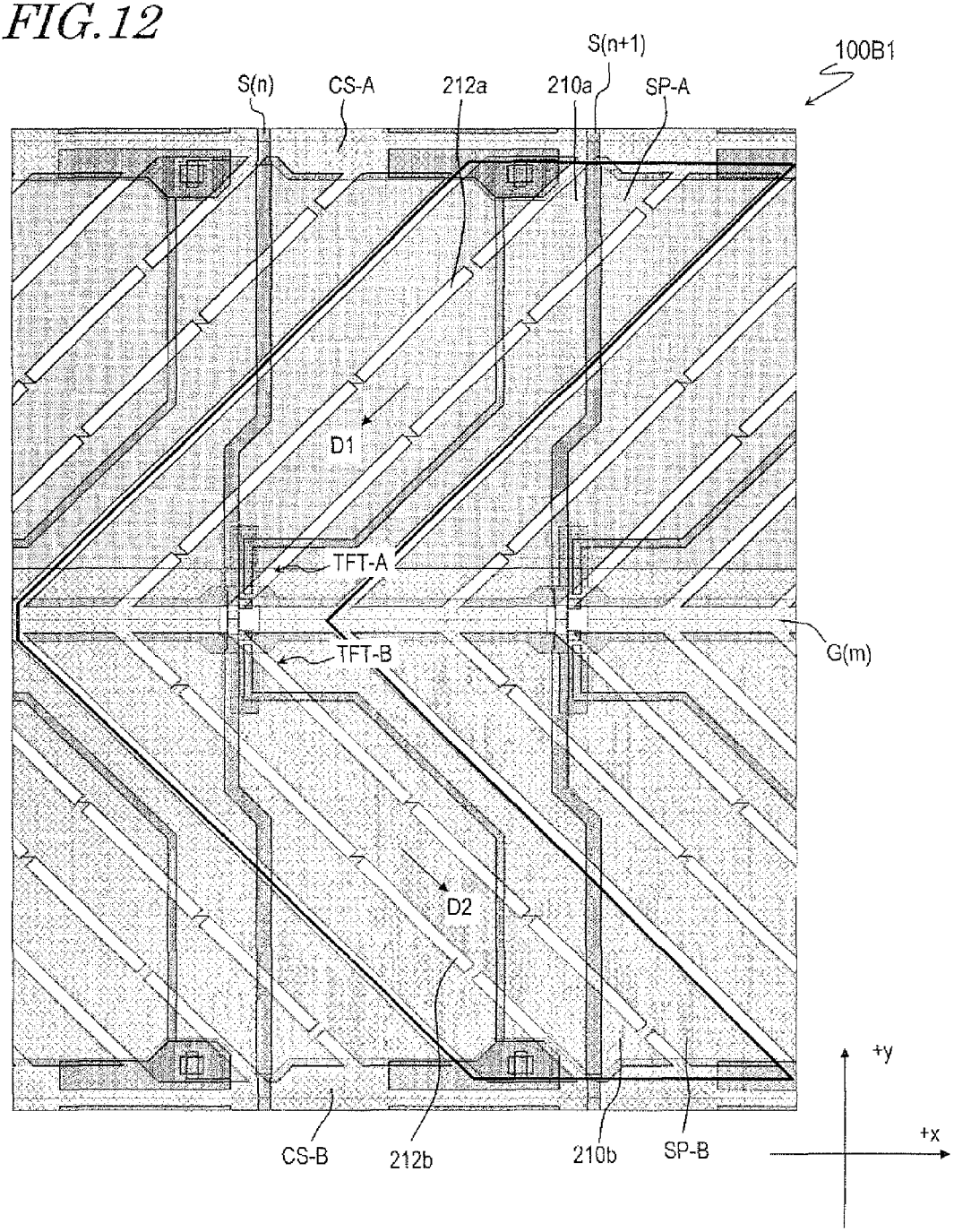
FIG. 12 is a schematic representation illustrating a liquid crystal display device as a modified example of the second embodiment.

FIG. 12 is a schematic plan view illustrating a liquid crystal display device 100B1 as a modified example of the liquid crystal display device 100B. As shown in FIG. 12, a subpixel electrode 210a that defines a subpixel SP-A is shaped so as to run from a 45 degree direction toward a 225 degree direction, and slits 212a, which also run from the 45 degree direction toward the 225 degree direction (i.e., in the direction D1), are cut through the subpixel electrode 210a. The subpixel electrode 210a includes three stripes that are arranged parallel to each other. And two stripes that are adjacent to each other are connected together. Likewise, a subpixel electrode 210b that defines a subpixel SP-B is also shaped so as to run from a 135 degree direction toward a 315 degree direction, and slits 212b, which also run from the 135 degree direction toward the 315 degree direction (i.e., in the direction D2), are out through the subpixel electrode 210b. The subpixel electrode 210b includes three stripes that are arranged parallel to each other. And two stripes that are adjacent to each other are connected together. A pixel including the subpixels SP-A and SP-B may have such a bent shape.

Embodiment 3

Hereinafter, a third embodiment of a liquid crystal display device according to the present invention will be described.

Figure 13:
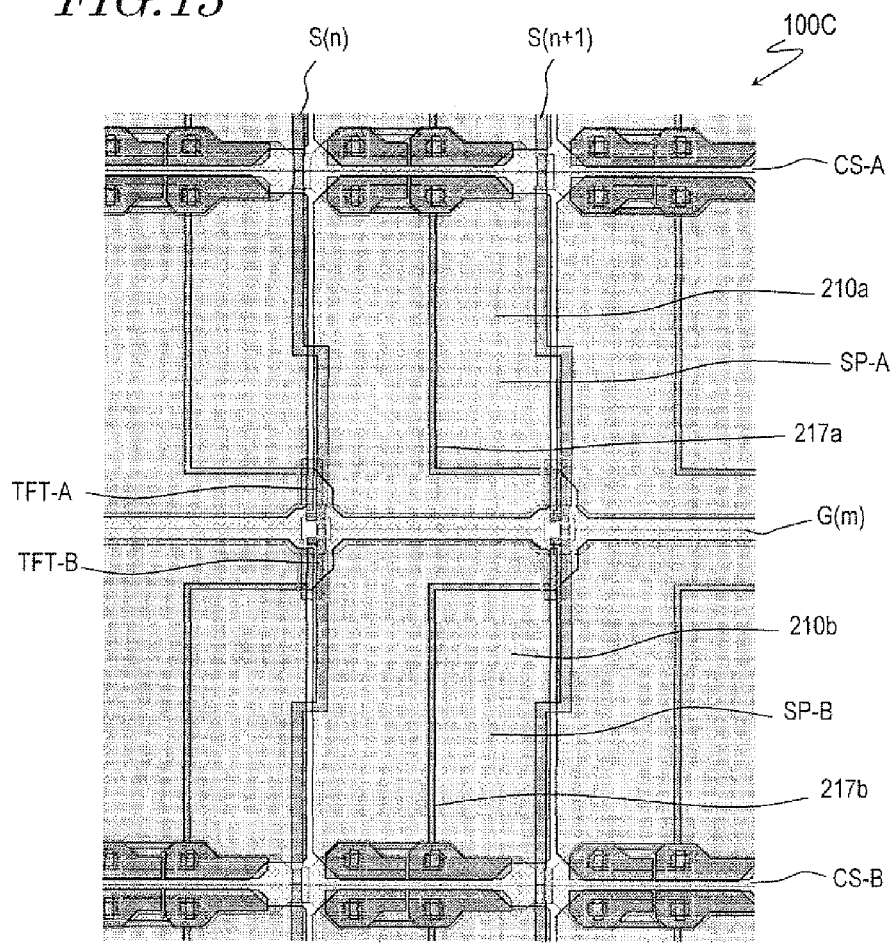
FIG. 13 is a schematic representation illustrating a third embodiment of a liquid crystal display device according to the present invention.

FIG. 13 is a schematic representation illustrating a liquid crystal display device 100C as a third embodiment of the present invention. Unlike the liquid crystal display devices 100A and 100B that operate in the VA mode, this liquid crystal display device 100C operates in the OCB mode. In the liquid crystal display devices 100A and 100B, the axes of polarization of their polarizers are parallel to the x and y axes. In this liquid crystal display device 100C, on the other hand, the axes of polarization of its polarizers are defined so as to cross (and typically define an angle of 45 degrees with respect to) the x and y axes. Also, the liquid crystal display devices 100A and 100B are normally black ones, but this liquid crystal display device 100C is a normally white one. As in the liquid crystal display device 100A, the alignment regulating means of this liquid crystal display device 100C is alignment films. It should be noted that this liquid crystal display device 100C is also represented by the same schematic cross-sectional view and the same equivalent circuit diagram as those of the liquid crystal display device 100A shown in FIGS. 1 and 2, and the overlapping description thereof will be omitted herein to avoid redundancies.

In this liquid crystal display device 100C, each pixel is split into two subpixels SP-A and SP-B, and subpixel electrodes 210a and 210b that define those subpixels SP-A and SP-B have a rectangular shape. The subpixel SP-A includes TFT-A, of which the gate, source and drain electrodes are respectively connected to a gate bus line G(m), a source bus line S(n), and a storage capacitor electrode opposed to a CS bus line CS-A by way of a drain extension line 217a. Through a contact hole that has been cut through a storage capacitor electrode, the drain extension line 217a is connected to the subpixel electrode 210a. Likewise, the subpixel SP-B includes TFT-B, of which the gate, source and drain electrodes are respectively connected to the gate bus line G(m), the source bus line S(n), and a storage capacitor electrode opposed to a CS bus line CS-B by way of a drain extension line 217b. Through a contact hole that has been cut through a storage capacitor electrode, the drain extension line 217b is connected to the subpixel electrode 210b. In this liquid crystal display device 100C, the orientation states of liquid crystal molecules in liquid crystal domains A and B change, and the luminances change eventually, responsive to the effective voltages applied to the liquid crystal layer of the subpixels SP-A and SP-B.

Hereinafter, advantages of the liquid crystal display device 100C of this embodiment over an LCD as a comparative example will be described. First of all, an LCD 500 representing a comparative example will be described with reference to FIG. 14. Just like the liquid crystal display device 100C, the LCD 500 also operates in the OCB mode.

As in the LCD 600A1, the LCD 500 also has two liquid crystal domains that have been subjected to a rubbing treatment in mutually different directions. Also, as in the LCDs 600B and 600C disclosed in Patent Document Nos. 2 and 3, each pixel of this LCD 500 is split into two subpixels SP-A and SP-B, too, and an alignment division structure is formed on a subpixel-by-subpixel basis. That is to say, in the LCD 500, each of these subpixels SP-A and SP-B has two liquid crystal domains A and B that have been subjected to an alignment treatment in mutually different directions.

As described above, in a liquid crystal display device that operates in the OCB mode, the two alignment films are subjected to an alignment treatment in substantially the same direction. And in the liquid crystal layer in the bend alignment state, liquid crystal molecules closer to the subpixel electrodes are induced to align and tilt in the alignment treatment direction, while liquid crystal molecules closer to the counter substrate are induced to align and tilt in a direction that is substantially antiparallel to the alignment treatment direction. Consequently, in the OCB-mode liquid crystal display device, a single liquid crystal domain has two reference alignment azimuths that are different from each other in the thickness direction. For that reason, in FIG. 14, two reference alignment azimuths are shown in each of the liquid crystal domains A and B. In this example, the liquid crystal domain A has reference alignment azimuths of 90 and 270 degrees, while the liquid crystal domain B has reference alignment azimuths of 0 and 180 degrees.

Figure 15:
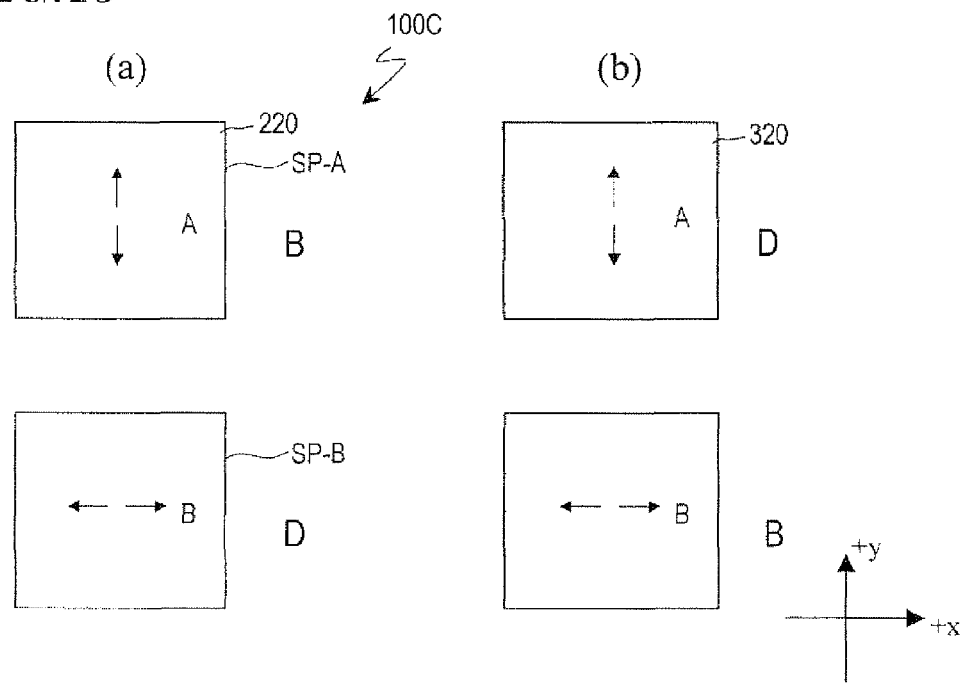
FIGS. 15(a) and 15(b) are schematic representations showing the reference alignment directions of liquid crystal molecules in the liquid crystal display device of the third embodiment in one vertical scanning period and the next vertical scanning period, respectively.
Figure 16:
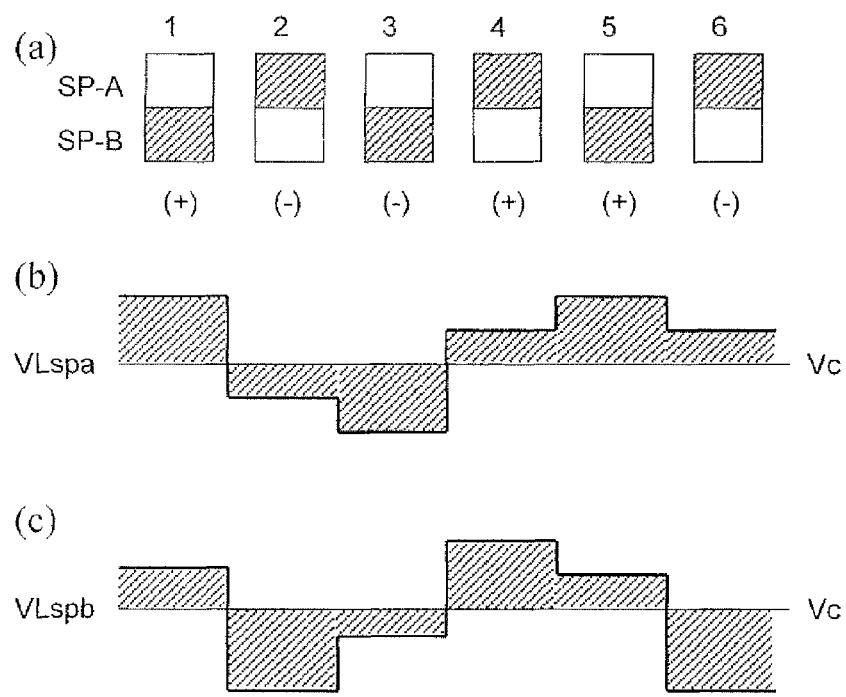
FIG. 16(a) is a schematic representation showing how subpixels SP-A and SP-B change their brightness levels and polarities in a modified example of embodiments of a liquid crystal display device according to the present invention and FIGS. 16(b) and 16(c) are schematic representations showing variations in the effective voltages applied to the liquid crystal layer of its subpixels SP-A and SP-B.
Figure 17:
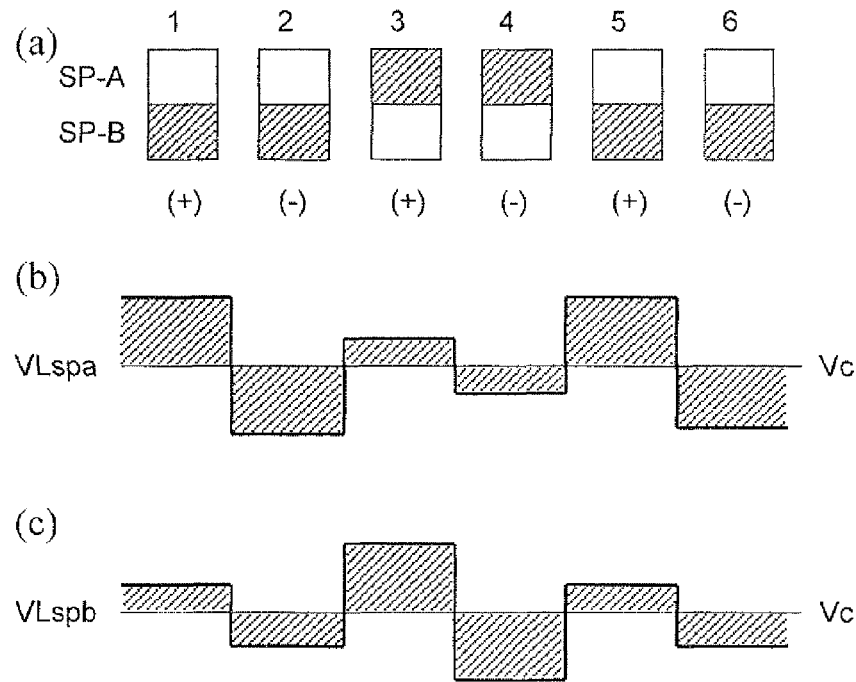
FIG. 17(a) is a schematic representation showing how subpixels SP-A and SP-B change their brightness levels and polarities in another modified example of embodiments of a liquid crystal display device according to the present invention and FIGS. 17(b) and 17(c) are schematic representations showing variations in the effective voltages applied to the liquid crystal layer of its subpixels SP-A and SP-B.
Figure 18:
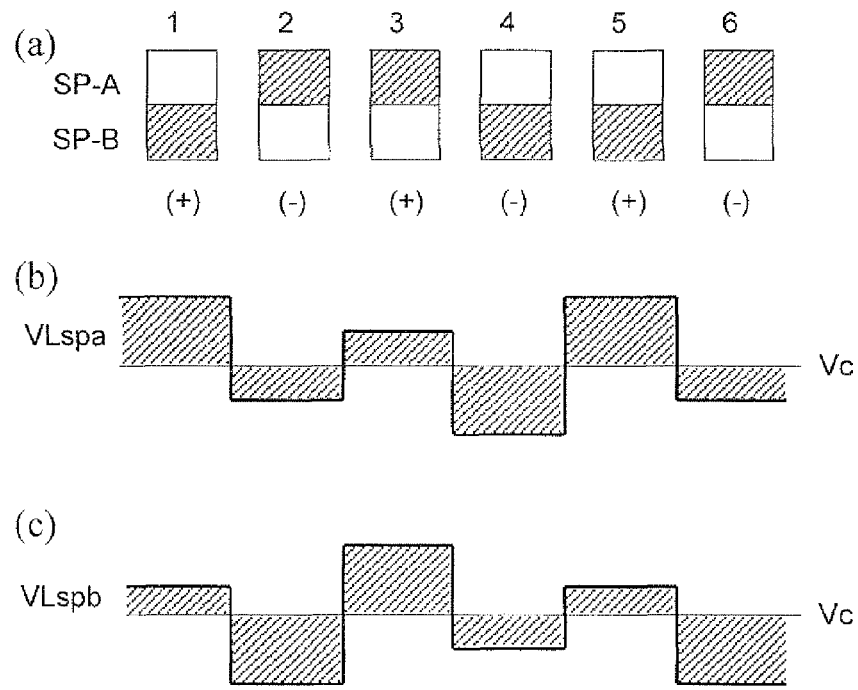
FIG. 18(a) is a schematic representation showing how subpixels SP-A and SP-B change their brightness levels and polarities in still another modified example of embodiments of a liquid crystal display device according to the present invention and FIGS. 18(b) and 18(c) are schematic representations showing variations in the effective voltages applied to the liquid crystal layer of its subpixels SP-A and SP-B.
Figure 19:
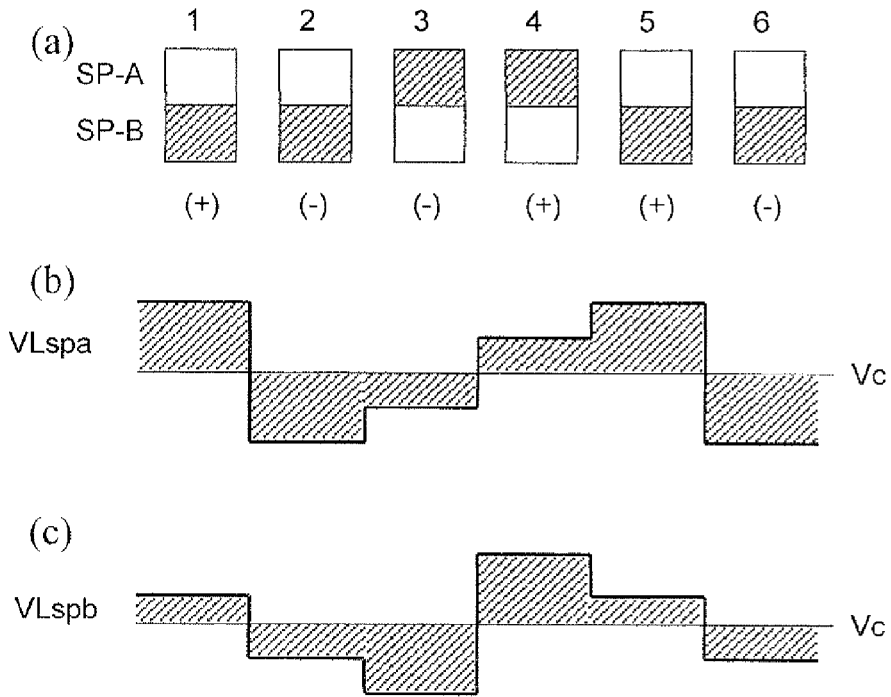
FIG. 19(a) is a schematic representation showing how subpixels SP-A and SP-B change their brightness levels and polarities in yet another modified example of embodiments of a liquid crystal display device according to the present invention and FIGS. 19(b) and 19(c) are schematic representations showing variations in the effective voltages applied to the liquid crystal layer of its subpixels SP-A and SP-B.
Figure 20:
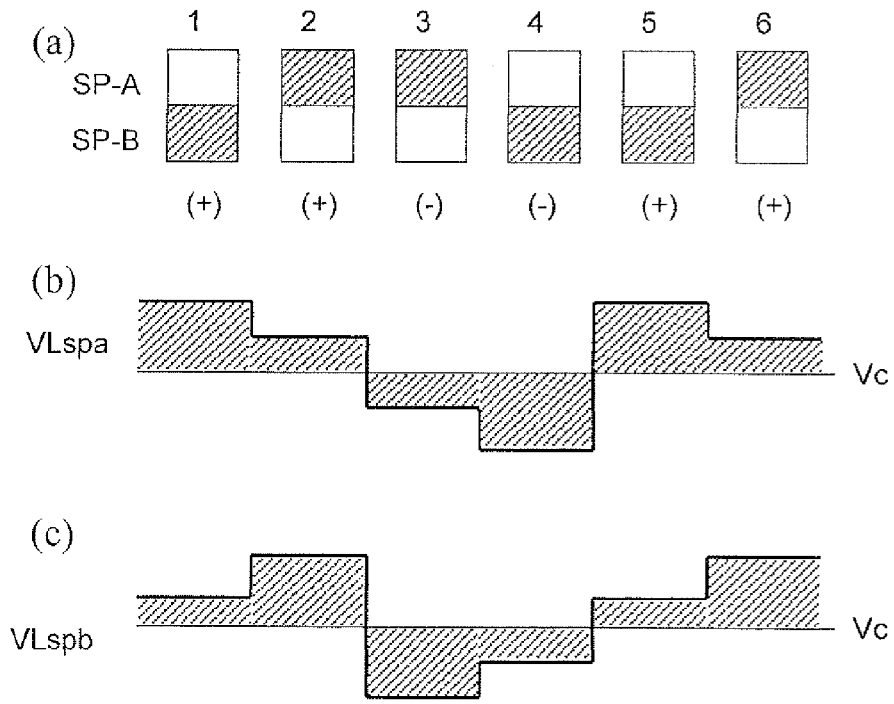
FIG. 20(a) is a schematic representation showing how subpixels SP-A and SP-B change their brightness levels and polarities in yet another modified example of embodiments of a liquid crystal display device according to the present invention and FIGS. 20(b) and 20(c) are schematic representations showing variations in the effective voltages applied to the liquid crystal layer of its subpixels SP-A and SP-B.
Figure 21:
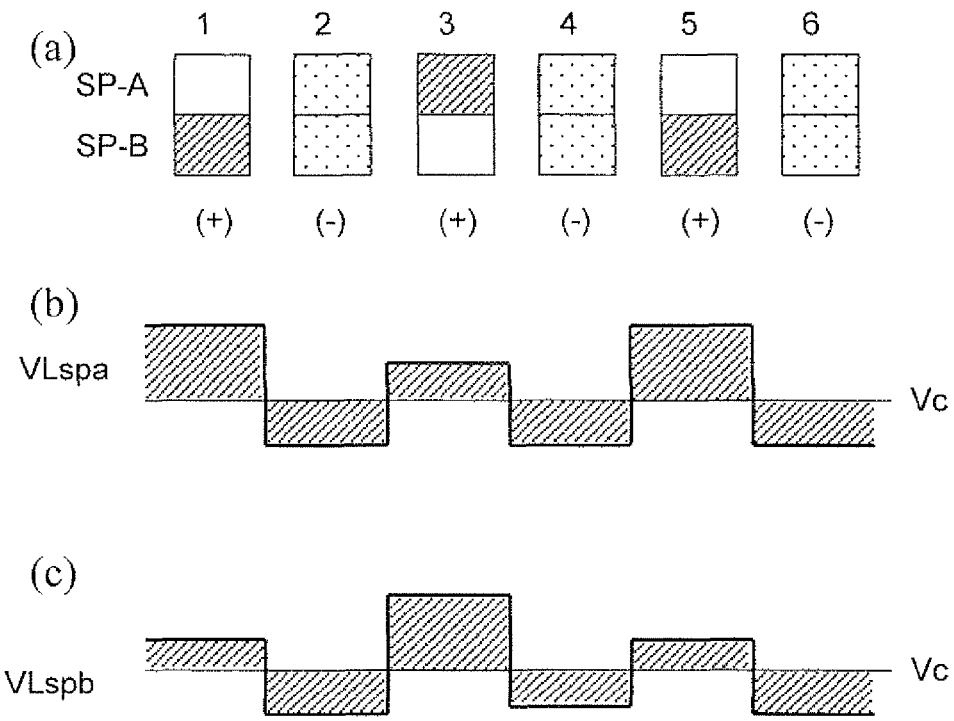
FIG. 21(a) is a schematic representation showing how subpixels SP-A and SP-B change their brightness levels and polarities in yet another modified example of embodiments of a liquid crystal display device according to the present invention and FIGS. 21(b) and 21(c) are schematic representations showing variations in the effective voltages applied to the liquid crystal layer of its subpixels SP-A and SP-B.
Figure 22:
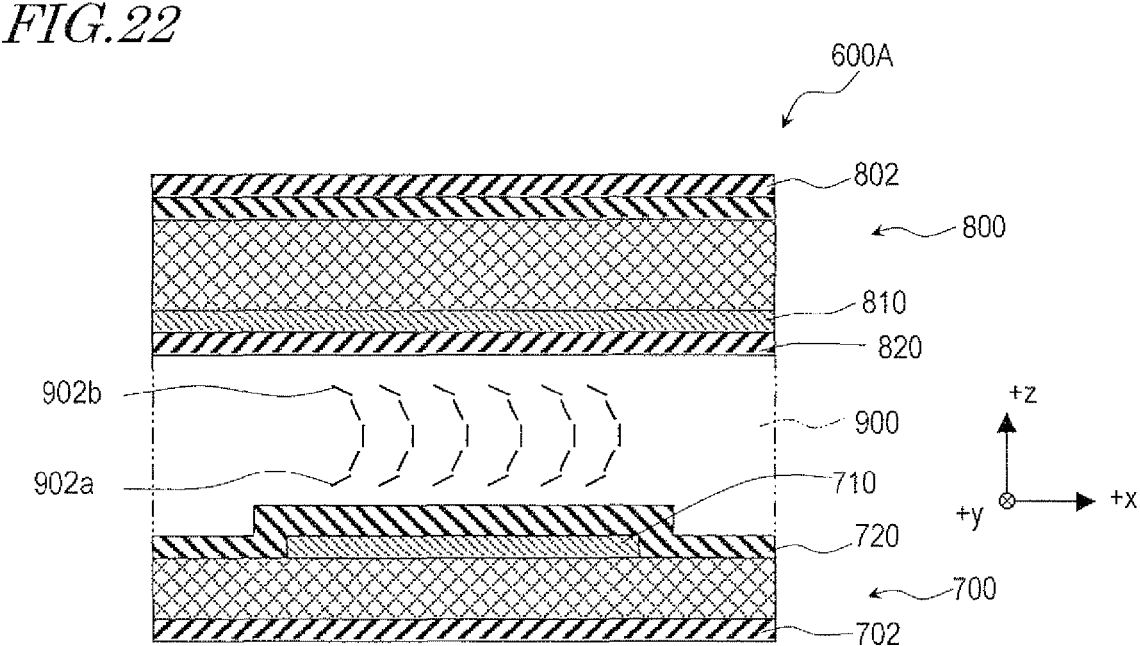
FIG. 22 is a schematic representation illustrating a configuration for a conventional OCB-mode LCD.
Figure 23:
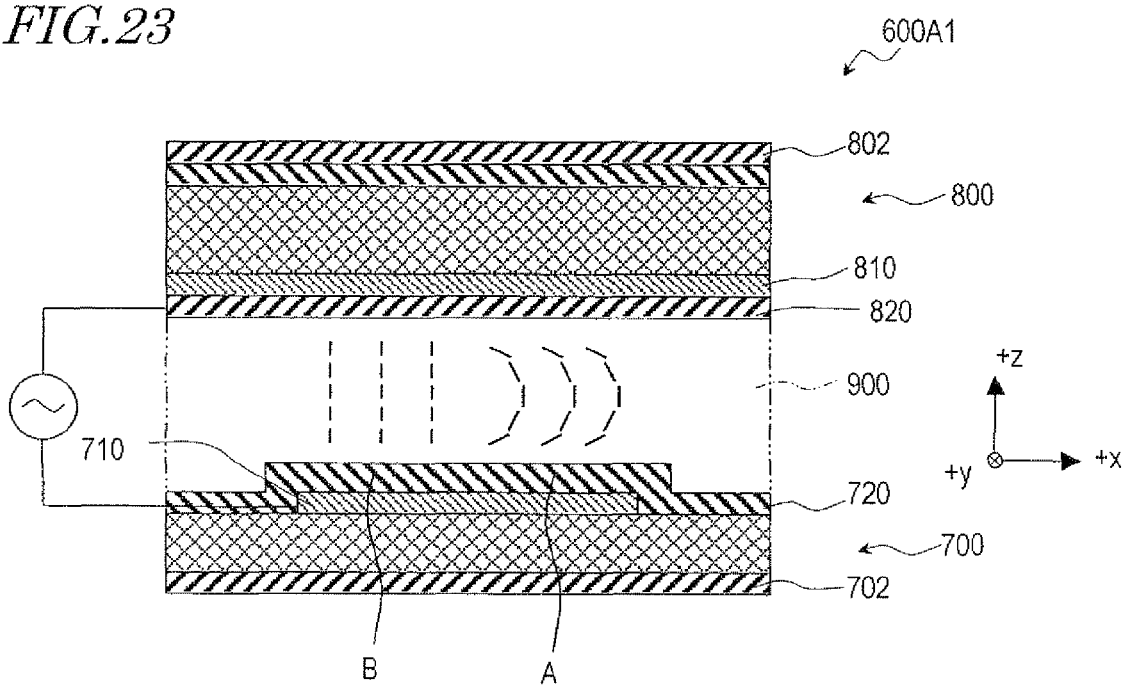
FIG. 23 is a schematic representation illustrating a configuration for another conventional OCB-mode LCD.
Figure 24:
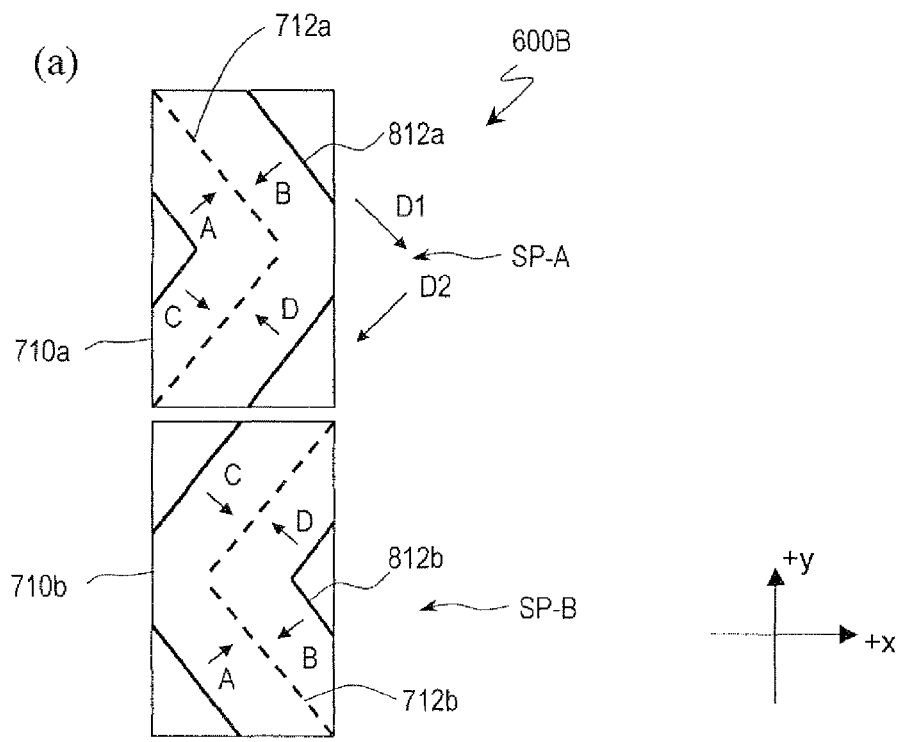
FIGS. 24(a) and 24(b) are respectively a schematic plan view and a schematic cross-sectional view illustrating a configuration for a conventional MVA-mode LCD.
Figure 24:
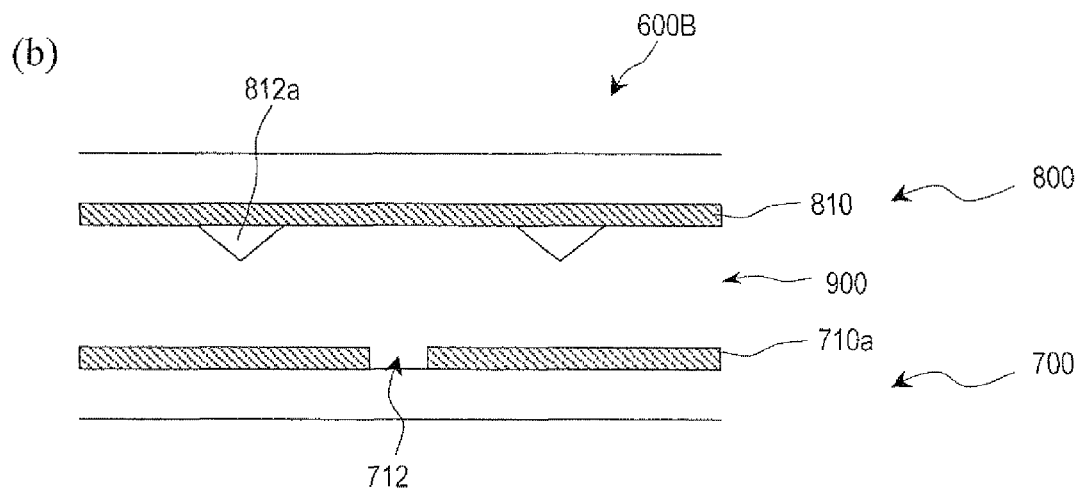
Figure 25:
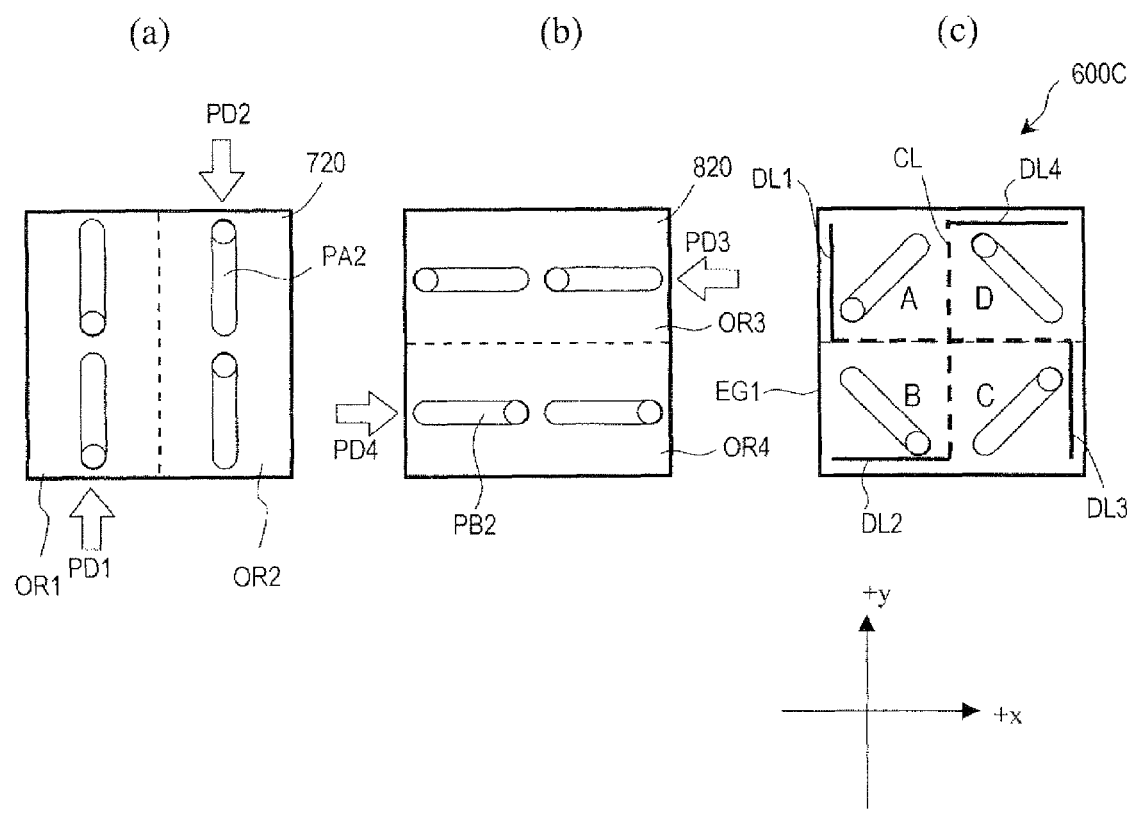
FIGS. 25(a) and 25(b) are schematic representations illustrating the two alignment films of a conventional VATN-mode LCD and FIG. 25(c) is a schematic representation illustrating the alignment directions of liquid crystal molecules around the respective centers of liquid crystal domains A to D.
Figure 26:
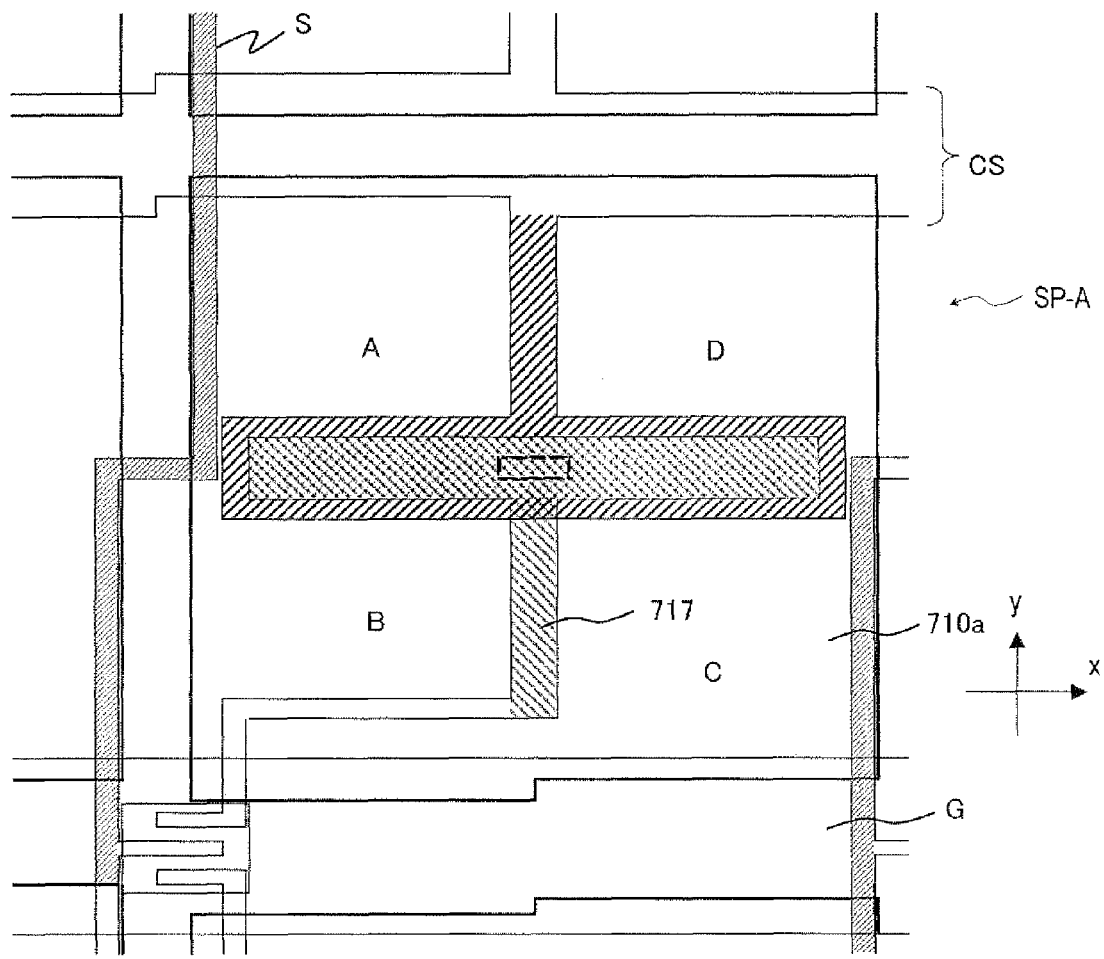
FIG. 26 is a schematic plan view illustrating the arrangement of the LCD shown in FIG. 25.

On the other hand, FIG. 15 schematically illustrates two subpixels that have mutually different reference alignment azimuths in the liquid crystal display device 100C. Specifically, FIG. 15(a) is a schematic representation showing the brightness levels of the subpixels SP-A and SP-B in one vertical scanning period and FIG. 15(b) is a schematic representation showing the brightness levels of the subpixels SP-A and SP-B in the next vertical scanning period. A liquid crystal domain A has been produced in the subpixel SP-A, in which the alignment films 220 and 320 shown in FIG. 1 are subjected to an alignment treatment in the +x direction, and has reference alignment azimuths of 90 and 270 degrees. Meanwhile, a liquid crystal domain B has been produced in the subpixel SP-B, in which the alignment films 220 and 320 shown in FIG. 1 are subjected to an alignment treatment in the +y direction, and has reference alignment azimuths of 0 and 180 degrees.

Figure 14:
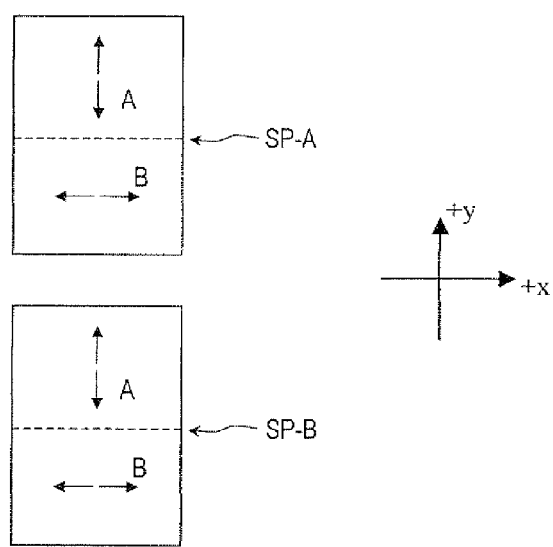
FIG. 14 is a schematic representation showing the reference alignment directions of liquid crystal molecules in a liquid crystal display device as a comparative example.

Comparing FIGS. 14 and 15 to each other, it can be seen easily that the number of liquid crystal domains in each of the subpixels SP-A and SP-B is smaller in this liquid crystal display device 100C than in the LCD 500. The same can be said about the number of boundaries between adjacent liquid crystal domains. Consequently, the decrease in transmittance is less significant in this liquid crystal display device 100C, no matter whether the boundary between the liquid crystal domains is shielded or not.

In this liquid crystal display device 100C, if the effective voltage applied to the liquid crystal layer of the subpixel SP-A is equal to the one applied to the liquid crystal layer of the subpixel SP-B, a symmetric viewing angle is realized as in the LCD 500 shown in FIG. 14. However, if in displaying a grayscale tone, for example, mutually different effective voltages are applied to the liquid crystal layer of the subpixels SP-A and SP-B to make one of the subpixels SP-A and SP-B a bright subpixel and the other a dark subpixel, the reference alignment azimuths of the bright and dark subpixels will not be symmetric to each other. Consequently, the symmetric viewing angle cannot be realized unless something is done about it. For that reason, the liquid crystal display device 100C of this embodiment also inverts the brightness levels of the subpixels.

In one vertical scanning period (which is supposed to be an $n^{th}$ vertical scanning period, where n is a natural number), the absolute value of an effective voltage applied to the liquid crystal layer of the subpixel SP-A is greater than that of an effective voltage applied to the liquid crystal layer of the subpixel SP-B as shown in FIG. 15(a). For example, as shown in FIG. 13, after a positive write voltage has been applied through the same source bus line S(n) to the subpixel electrodes 210a and 210b that define the subpixels SP-A and SP-B, the subpixel electrode 210a has its voltage raised by the CS bus line CS-A, while the subpixel electrode 210b that defines the subpixel SP-B has its voltage lowered by the CS bus line CS-A. As a result, the absolute value of the effective voltage applied to the liquid crystal layer of the subpixel SP-A becomes greater than that of the effective voltage applied to the liquid crystal layer of the subpixel SP-B. In that case, the subpixel SP-A becomes a bright subpixel and the subpixel SP-B becomes a dark subpixel. Also, in this vertical scanning period, the bright (B)/dark (B) states and the reference alignment azimuths of the two liquid crystal domains A and B of a single pixel are (B, 90°·270°) and (D, 0°·180°).

Thereafter, in the next vertical scanning period (which is supposed to be an $(n+1)^{th}$ vertical scanning period), the absolute value of an effective voltage applied to the liquid crystal layer of the subpixel SP-B is greater than that of an effective voltage applied to the liquid crystal layer of the subpixel SP-A as shown in FIG. 15(b). For example, as shown in FIG. 13, after a negative write voltage has been applied through the same source bus line S(n) to the subpixel electrodes 210a and 210b that define the subpixels SP-A and SP-B, the subpixel electrode 210a has its voltage raised by the CS bus line CS-A, while the subpixel electrode 210b that defines the subpixel SP-B has its voltage lowered by the CS bus line CS-A. As a result, the absolute value of the effective voltage applied to the liquid crystal layer of the subpixel SP-B becomes greater than that of the effective voltage applied to the liquid crystal layer of the subpixel SP-A. In that case, the subpixel SP-A becomes a dark subpixel and the subpixel SP-B becomes a bright subpixel. Also, in this vertical scanning period, the B/D states and the reference alignment azimuths of the two liquid crystal domains A and B of a single pixel are (D, 90°·270°) and (B, 0°·180°).

Over these two vertical scanning periods, each bright subpixel has symmetric reference alignment azimuths, so does each dark subpixel. In this manner, each of the liquid crystal domains A and B in which liquid crystal molecules have mutually different reference alignment azimuths belongs to both of the bright and dark subpixels. Unlike the LCD 500, this liquid crystal display device 100C does not realize symmetric reference alignment directions in the bright and dark subpixels every vertical scanning period, but does realize the symmetric reference alignment directions every other vertical scanning period. In addition, by inverting the brightness levels of the subpixels SP-A and SP-B, the degree of non-smoothness of the image on the screen can be reduced.

Optionally, in this liquid crystal display device 100C, the polarity, as well as the brightness level, may also be inverted every vertical scanning period just as already described with reference to FIG. 5. Or as already described with reference to FIG. 6, the averages of the effective voltages applied to liquid crystal layer of the subpixels SP-A and SP-B over four consecutive vertical scanning periods may be substantially equal to each other to minimize the image persistence.

In each of the liquid crystal display devices 100A, 100B and 100C described above, to make the averages of effective voltages applied to the liquid crystal layer substantially equal to each other between the subpixels SP-A and SP-B, the polarity is supposed to invert every other vertical scanning period and the brightness level is supposed to invert every vertical scanning period as already described with reference to FIG. 6. However, the present invention is not limited to it. The brightness levels and the polarities of the subpixels SP-A and SP-B may also be changed so that (B, +), (B, −), (D, +) and (D, −) appear in any arbitrary order over four consecutive vertical scanning periods. Alternatively, the brightness level may also be inverted so that a vertical scanning period in which the subpixels SP-A and SP-B have the same brightness level is interposed between two vertical scanning periods. Such a change of the brightness levels and polarities of the subpixels SP-A and SP-B is disclosed in Japanese Patent Application No. 2006-228476, for example, the disclosure of which is hereby incorporated by reference.

Hereinafter, it will be described with reference to FIGS. 16 through 21 how the brightness levels and polarities of the subpixels SP-A and SP-B and the effective voltages applied to the liquid crystal layer of the subpixels SP-A and SP-B may change in the liquid crystal display device.

As shown in FIG. 16(a), the brightness level and polarity of the subpixel SP-A may change in the order of (B, +), (D, −), (B, −) and (D, +) and the brightness level and polarity of the subpixel SP-B may change in the order of (D, +), (B, −), (D, −) and (B, +). In that case, the brightness level of the subpixels SP-A and SP-B inverts every vertical scanning period and their polarity inverts every other vertical scanning period.

Alternatively, as shown in FIG. 17(a), the brightness level and polarity of the subpixel SP-A may also change in the order of (B, +), (B, −), (D, +) and (D, −) and the brightness level and polarity of the subpixel SP-B may also change in the order of (D, +), (D, −), (B, +) and (B, −). In that case, the brightness level of the subpixels SP-A and SP-B inverts every other vertical scanning period and their polarity inverts every vertical scanning period.

Still alternatively, as shown in FIG. 18(a), the brightness level and polarity of the subpixel SP-A may also change in the order of (B, +), (D, −), (D, +) and (B, −) and the brightness level and polarity of the subpixel SP-B may also change in the order of (D, +), (B, −), (B, +) and (D, −). In that case, the brightness level of the subpixels SP-A and SP-B inverts every other vertical scanning period and their polarity inverts every vertical scanning period.

Still alternatively, as shown in FIG. 19(a), the brightness level and polarity of the subpixel SP-A may also change in the order of (B, +), (B, −), (D, −) and (D, +) and the brightness level and polarity of the subpixel SP-B may also change in the order of (D, +), (D, −), (B, −) and (B, +). In that case, the brightness level of the subpixels SP-A and SP-B inverts every other vertical scanning period and their polarity also inverts every other vertical scanning period. But the timings of inversion of the polarity of the subpixels SP-A and SP-B are shifted by one vertical scanning period from the timings of inversion of their brightness level.

Still alternatively, as shown in FIG. 20(a), the brightness level and polarity of the subpixel SP-A may also change in the order of (B, +), (D, +), (D, −) and (B, −) and the brightness level and polarity of the subpixel SP-B may also change in the order of (D, +), (B, +), (B, −) and (D, −). In that case, the brightness level of the subpixels SP-A and SP-B inverts every other vertical scanning period and their polarity also inverts every other vertical scanning period. But the timings of inversion of the polarity of the subpixels SP-A and SP-B are shifted by one vertical scanning period from the timings of inversion of their brightness level.

In the examples described above, the brightness level of the subpixels SP-A and SP-B is supposed to invert either every vertical scanning period or every other vertical scanning period. However, the present invention is not limited to it. The brightness level of the subpixels SP-A and SP-B may also invert with a vertical scanning period in which the subpixels SP-A and SP-B have the same brightness level interposed.

In such a situation, the brightness level and polarity of the subpixel SP-A change in the order of (B, +), (moderate (M), −), (D, +), and (M, −) and the brightness level and polarity of the subpixel SP-B also change in the order of (D, +), (M, −), (B, +) and (M, −) as shown in FIG. 21(a). As used herein, the "moderate" means that the brightness level (the luminance) of the subpixel SP-A is equal to the subpixel SP-B. In this case, the brightness of the subpixels SP-A and SP-B changes between those three levels every vertical scanning period with the moderate luminance interposed and their polarity inverts every vertical scanning period. Then, as the brightness level of the subpixels SP-A and SP-B inverts, the degree of non-smoothness of the image on the screen can be reduced. On top of that, as shown in FIGS. 21(b) and (c), the average of the effective voltages VLspa over a number of vertical scanning periods becomes approximately equal to that of the effective voltages VLspb over the same periods. Thus, since the averages of the effective voltages VLspa and VLspb can be both reduced to substantially zero by regulating the counter voltage, the occurrence of image persistence and other reliability issues can be almost eliminated.

Note that the entire disclosure of Japanese Patent Application No. 2007-322274, on which the present application claims priority, is hereby incorporated by reference.

INDUSTRIAL APPLICABILITY

The present invention provides a liquid crystal display device that has good viewing angle characteristic and high transmittance.

The invention claimed is:

1. A liquid crystal display device comprising a plurality of pixels, each of which includes first and second subpixels,
   wherein each of the first and second subpixels includes a counter electrode, a subpixel electrode, and a liquid crystal layer that is arranged between the counter electrode and the subpixel electrode, and
   wherein the liquid crystal layer of each said pixel has liquid crystal molecules that are induced to align in a number of reference alignment directions, including first, second, third and fourth reference alignment directions, at least at a particular grayscale, and
   wherein if the azimuthal components that define those reference alignment directions are called reference alignment azimuths, first, second, third and fourth reference alignment azimuths, defining the first, second, third and fourth reference alignment directions, respectively, are different from each other, and wherein the reference alignment azimuths of the liquid crystal molecules in the liquid crystal layer of the first subpixel include only the first and second reference alignment azimuths and include neither the third nor fourth reference alignment azimuth, and wherein the reference alignment azimuths of the liquid crystal molecules in the liquid crystal layer of the second subpixel include only the third and fourth reference alignment azimuths and include neither the first nor second reference alignment azimuth, and wherein in one vertical scanning period, the absolute value of an effective voltage applied to the liquid crystal layer of the first subpixel is greater than that of an effective voltage applied to the liquid crystal layer of the second subpixel, and in another vertical scanning period that is posterior to the one vertical scanning period, the absolute value of an effective voltage applied to the liquid crystal layer of the second subpixel is greater than that of an effective voltage applied to the liquid crystal layer of the first subpixel.

2. The liquid crystal display device of claim 1, wherein the angle formed between any two of the first, second, third and fourth reference alignment azimuths is substantially an integral multiple of 90 degrees.

3. The liquid crystal display device of claim 1, wherein the counter electrode of each of the first sub-pixel and the second sub-pixel is a single common electrode.

4. The liquid crystal display device of claim 1, wherein the liquid crystal layer of the first subpixel includes: a first liquid crystal domain in which liquid crystal molecules are induced to align in the first reference alignment direction in response to an applied voltage; and a second liquid crystal domain in which liquid crystal molecules are induced to align in the second reference alignment direction in response to the applied voltage, and wherein the liquid crystal layer of the second subpixel includes: a third liquid crystal domain in which liquid crystal molecules are induced to align in the third reference alignment direction in response to an applied voltage; and a fourth liquid crystal domain in which liquid crystal molecules are induced to align in the fourth reference alignment direction in response to the applied voltage.

5. The liquid crystal display device of claim 4, wherein the liquid crystal layer includes a vertical alignment liquid crystal layer.

6. The liquid crystal display device of claim 4, wherein liquid crystal molecules around the center of the first, second, third and fourth liquid crystal domains are induced to align in the first, second, third and fourth reference alignment azimuths, respectively, in response to the applied voltage.

7. The liquid crystal display device of claim 6, wherein the angle formed between the first and second reference alignment azimuths is approximately 90 degrees and the angle formed between the third and fourth reference alignment azimuths is also approximately 90 degrees.

8. The liquid crystal display device of claim 4, wherein each of the first and second subpixels further includes at least one alignment film that defines the pretilt direction of the liquid crystal molecules of the liquid crystal layer.

9. The liquid crystal display device of claim 8, wherein the at least one alignment film includes a first alignment film and a second alignment film that faces the first alignment film across the liquid crystal layer, and wherein the first alignment film has a first alignment region that induces alignment of the liquid crystal molecules of the first and second liquid crystal domains in a first pretilt direction and a second alignment region that induces alignment of the liquid crystal molecules of the third and fourth liquid crystal domains in a second pretilt direction, and wherein the second alignment film has a third alignment region that induces alignment of the liquid crystal molecules of the first and fourth liquid crystal domains in a third pretilt direction and a fourth alignment region that induces alignment of the liquid crystal molecules of the second and third liquid crystal domains in a fourth pretilt direction.

10. The liquid crystal display device of claim 9, wherein the first, second, third and fourth alignment regions have been subjected to alignment treatment in first, second, third and fourth alignment treatment directions, respectively, and wherein the first alignment treatment direction of the first alignment region is substantially antiparallel to the second alignment treatment direction of the second alignment region, and wherein the third alignment treatment direction of the third alignment region is substantially antiparallel to the fourth alignment treatment direction of the fourth alignment region.

11. The liquid crystal display device of claim 9, wherein the first, second, third and fourth alignment regions are defined by optical alignment treatment.

12. The liquid crystal display device of claim 1, wherein a slit or a rib is provided in at least one of the counter electrode and the subpixel electrode of each of the first and second subpixels.

13. The liquid crystal display device of claim 12, wherein the angle formed between the first and second reference alignment azimuths is approximately 180 degrees, and the angle formed between the third and fourth reference alignment azimuths is also approximately 180 degrees.

14. The liquid crystal display device of claim 1, wherein the liquid crystal layer of the first subpixel has a first liquid crystal domain, and wherein the liquid crystal layer of the second subpixel has a second liquid crystal domain, and wherein the liquid crystal layer includes an OCB-mode liquid crystal layer, and wherein in the liquid crystal layer of the first subpixel, liquid crystal molecules closer to the counter electrode are induced to align in the first reference alignment direction and liquid crystal molecules closer to the subpixel electrode are induced to align in the second reference alignment direction, and wherein in the liquid crystal layer of the second subpixel, liquid crystal molecules closer to the counter electrode are induced to align in the third reference alignment direction and liquid crystal molecules closer to the subpixel electrode are induced to align in the fourth reference alignment direction.

15. The liquid crystal display device of claim 14, wherein each of the first and second subpixels further includes at least one alignment film that defines the pretilt direction of the liquid crystal molecules of the liquid crystal layer.

16. The liquid crystal display device of claim 15, wherein the at least one alignment film includes a first alignment film and a second alignment film that faces the first alignment film across the liquid crystal layer, and wherein the first alignment film has a first alignment region that induces alignment of the liquid crystal molecules of the first liquid crystal domain in a first pretilt direction and a second alignment region that induces alignment of the liquid crystal molecules of the second liquid crystal domain in a second pretilt direction, and wherein the second alignment film has a third alignment region that induces alignment of the liquid crystal molecules of the first liquid crystal domain in a third pretilt direction and a fourth alignment region that induces alignment of the liquid crystal molecules of the second liquid crystal domain in a fourth pretilt direction.

17. The liquid crystal display device of claim 16, wherein the first, second, third and fourth alignment regions have been subjected to alignment treatment in first, second, third and fourth alignment treatment directions, respectively, so as to define the first, second, third and fourth pretilt directions, and wherein the angle formed between the first and second alignment treatment directions of the first and second alignment regions is approximately 90 degrees, and wherein the angle formed between the third and fourth alignment treatment directions of the third and fourth alignment regions is also approximately 90 degrees.

18. The liquid crystal display device of claim, wherein if a predetermined grayscale tone is displayed continuously over an even number of, and at least two, vertical scanning periods, the first and second subpixels have mutually different luminances in at least two of the even number of vertical scanning periods, and in each of the first and second subpixels, a first polarity period, which is included in the even number of vertical scanning periods and which has a first polarity, is as long as a second polarity period, which is also included in the even number of vertical scanning periods and which has a second polarity, and in each of the first and second polarity periods, the difference between the average of effective voltages applied to the liquid crystal layer of the first subpixel and that of effective voltages applied to the liquid crystal layer of the second subpixel is substantially equal to zero.

* * * * *